United States Patent
Hoshuyama

(10) Patent No.: US 8,488,776 B2
(45) Date of Patent: Jul. 16, 2013

(54) ECHO SUPPRESSING METHOD AND APPARATUS

(75) Inventor: Osamu Hoshuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 12/738,457

(22) PCT Filed: Oct. 16, 2008

(86) PCT No.: PCT/JP2008/068784
§ 371 (c)(1),
(2), (4) Date: Apr. 16, 2010

(87) PCT Pub. No.: WO2009/051197
PCT Pub. Date: Apr. 23, 2009

(65) Prior Publication Data
US 2010/0208908 A1 Aug. 19, 2010

(30) Foreign Application Priority Data
Oct. 19, 2007 (JP) .................... 2007-272524

(51) Int. Cl.
*H04M 9/08* (2006.01)
(52) U.S. Cl.
USPC ........... 379/406.09; 379/406.05; 379/406.1; 379/406.11; 379/406.13; 379/406.14
(58) Field of Classification Search
USPC ........................... 379/406.01–406.16
See application file for complete search history.

(56) References Cited

U.S. PATENT DOCUMENTS

| | | | |
|---|---|---|---|
| 5,608,793 | A | 3/1997 | Uriya |
| 2004/0018860 | A1* | 1/2004 | Hoshuyama ............... 455/569.1 |
| 2009/0041263 | A1 | 2/2009 | Hoshuyama |
| 2009/0154717 | A1 | 6/2009 | Hoshuyama |

FOREIGN PATENT DOCUMENTS

| | | |
|---|---|---|
| EP | 1 942 582 A1 | 7/2008 |
| JP | 8-9005 A | 1/1996 |
| JP | 2004-56453 A | 2/2004 |

(Continued)

OTHER PUBLICATIONS

Eberhard Hansler, The Hands-Free Telephone Problem: An Annotated Bibliography Update, Annals of Telecommunications, 1994, pp. 360-367.

(Continued)

*Primary Examiner* — Duc Nguyen
*Assistant Examiner* — Ibraham Sharifzada
(74) *Attorney, Agent, or Firm* — Foley & Lardner LLP

(57) ABSTRACT

The coefficient generating section receives a first signal which is the output signal of the microphone of a signal generated by subtracting the output signal of a linear echo canceller from the output signal of the microphone and a second signal which is the output signal of the linear echo canceller. The coefficient generating section detects the minimum value of the variation with time of the ratio of the amplitude of the first signal to that of the second signal and outputs the value of constant times the detected minimum value as a crosstalk coefficient indicating the degree of crosstalk of the echo. The converting section corrects the first signal according to the crosstalk coefficient and the second signal to generate a near-end signal which is the resultant signal of when the echo is removed from the first signal and outputs the near-end signal to an output terminal.

19 Claims, 16 Drawing Sheets

FOREIGN PATENT DOCUMENTS

| JP | 2006-33789 | A | | 2/2006 |
|----|----|----|----|----|
| JP | 2006033789 | A | * | 2/2006 |
| JP | 2006-352239 | A | | 12/2006 |
| JP | 2006-352494 | A | | 12/2006 |
| WO | WO 2007/049643 | A1 | | 5/2007 |
| WO | WO 2007/049644 | A1 | | 5/2007 |
| WO | WO 2007049643 | A1 | * | 5/2007 |

OTHER PUBLICATIONS

Xiaojian Lu et al., Acoustical Echo Cancellation Over a Non-Linear Channel, International Workshop on Acoustic Echo and Noise Control, 2001, 4 pages.

A. Alvarez et al., A Speech Enhancement System Based on Negative Beamforming and Spectral Subtraction, International Workshop on Acoustic Echo and Noise Control, 2001, 4 pages.

Christof Faller et al., Supressing Acoustic Echo in a Spectral Envelope Space, IEEE Transactions on Speech and Audio Processing, Sep. 2005, pp. 1048-1062.

John J. Shynk, Frequency-Doman and Multirate Adaptive Filtering, IEEE Signal Processing Magazine, Jan. 1992, pp. 14-37.

Machine translation of JP 2006-033789.

* cited by examiner

EXEMPLARY ARRANGEMENT OF LOUDSPEAKER AND MICROPHONE (a) STATUS OF BEING OPENED (FRONT)

(b) STATUS OF BEING CLOSED (BACK)

(c) STATUS OF BEING OPENED (BACK)

POWER OF OUTPUT SIGNAL OF LINEAR ECHO CANCELLER

ECHO SUPPRESSING METHOD AND APPARATUS

APPLICABLE FIELD IN THE INDUSTRY

The present invention relates to a technology of suppressing an echo in a situation in which loud-speaking and sound pickup are carried out simultaneously, for example, a hands-free telephone set and an apparatus for recognizing sound while reproducing car stereo.

BACKGROUND ART

An exemplary configuration of a first technology for suppressing the echo caused by acoustic system coupling between a sound pickup apparatus and a loudspeaker in the hands-free telephone set is shown in FIG. 30. In FIG. 30, a sound signal (which is called a far-end signal) of a call partner being applied to an input terminal 10 is produced as a far-end sound from a loudspeaker 2. The necessary sound, for example, speaker's voice (which is called near-end sound) enters a microphone 1, and simultaneously therewith, the far-end sound produced from the loudspeaker 2 leaks into it through space. This crosstalk is called an echo. Further, the acoustic transmission system including the loudspeaker 2 and the microphone 1, which handles sound-related signals ranging from the far-end signal to the output signal of the microphone 1, is called an echo path.

Only the near-end sound is desired to be sent as a near-end signal from an output terminal 9, and the echo of the far-end sound that has been produced from the loudspeaker 2 and yet has leaked into the microphone 1 is desired to be removed. When the far-end sound leaks at a high volume level, the delayed far-end sound is audible as an echo to a call partner, so that it becomes difficult to originate a call in the far-end side. The technique, which, as a rule, is applied so as to address this problem, is a technique that employs a linear echo canceller. The linear echo canceller is described, for example, in Non-patent document 1.

In FIG. 30, a linear echo canceller 3 simulates a transfer function of the echo path. The linear echo canceller 3 uses the signal inputted into the loudspeaker 2 (far-end signal) to generate a simulated signal of the echo, which leaks into the sound received by the microphone 1, namely, an echo replica signal by employing this simulated transfer function, and a subtracter 4 subtracts the echo replica signal from the sound received by the microphone 1, thereby to generate the near-end signal. Additionally, a sound detector 5 inputs the output of the microphone 1, the output of the linear echo canceller 3, the output of the subtracter 4, and the far-end signal, respectively, detects whether the near-end sound exists, outputs 0 or a very small value as a sound detection result when the near-end sound exists, and outputs a large value when no near-end sound exists.

An operation of the linear echo canceller 3 will be explained by employing FIG. 31. FIG. 31 is a view illustrating an exemplary configuration of the linear echo canceller 3. An exemplary configuration of the linear echo canceller 3 shown in FIG. 31 is configured of an adaptive filter 30 and a multiplier 35. The adaptive filter 30 has the far-end signal inputted from a terminal 31 as an input, and outputs a result by a linear filter operation from a terminal 32. Herein, a filter coefficient that is used for performing the linear filter operation in the adaptive filter 30 is updated every moment. The above update is performed by employing a correlative arithmetic operation so that the subtraction result received from the terminal 33 is minimized. As a result, the subtraction result that is added to the terminal 33 includes the minimized component correlative to the far-end signal. That is, the echo of the far-end signal results in being removed.

The multiplier 35 is inserted into the path from the terminal 33 to the adaptive filter 30 so as to control an amount of the update of the filter coefficient in the adaptive filter 30. In the case that the multiplier 35 does not exist, when the filter coefficient of the adaptive filter 30 is updated in a situation in which the near-end sound exists, the filter coefficient is disordered temporarily, and the removal amount of the echo is diminished. The multiplier 35 sends to the adaptive filter 30 a result obtained by multiplying the subtraction result received from the terminal 33 by the sound detection result coming from the sound detector 5, which has been received from a terminal 34. The update of the filter coefficient of the adaptive filter 30 is suppressed and the disorder of the filter coefficient disappears because the sound detection result becomes 0 or a very small value when the near-end sound exists. As a result, a high echo removal amount is gained.

In such a manner, the linear echo canceller can remove the echo of the far-end signal by employing the adaptive filter. Various configurations such as an FIR type, an IIR type, and a lattice type can be employed for the adaptive filter.

A second technology for suppressing the echo caused by the acoustic-system coupling between the sound pickup apparatus and the loudspeaker is described in Patent document 1. This second technology modifies the echo replica signal of the echo canceller based upon a rotary angle of a hinge of a folding-type mobile telephone apparatus. Specifically, the second technology includes a control signal generation means for detecting the rotary angle of the hinge and outputting a control signal equivalent to the above rotary angle, and a sound control means having an echo control means for suppressing the echo in accordance with the foregoing control signal, and the foregoing echo suppression means includes a coefficient selection circuit for storing a plurality of predetermined echo path tracking coefficients, which are used to generate a pseudo echo that tracks a fluctuating echo path, and using the foregoing control signal as an address designation signal to output the foregoing echo path tracking coefficient, an adaptive control circuit for outputting an pseudo echo modification signal, which is used to modify the foregoing pseudo echo, based upon the foregoing echo path tracking coefficient, a pseudo echo generation circuit for generating the pseudo echo based upon the foregoing pseudo echo modification signal, and a subtraction circuit for subtracting the foregoing pseudo echo from the echo inputted from a sound inputting means.

A third technology for suppressing the echo caused by the acoustic-system coupling between the sound pickup apparatus and the loudspeaker is described in Patent document 2. When either the output signal of the sound pickup apparatus or the signal obtained by subtracting the output signal of the echo canceller from the output signal of the sound pickup apparatus is defined as a first signal and the foregoing output signal of the echo canceller is defined as a second signal, the third technology calculates an estimation value of a degree of the crosstalk of the echo from the foregoing first signal and the foregoing second signal, and corrects the foregoing first signal based upon this calculated estimation value. As the foregoing estimation value, a ratio of an amount corresponding to an amplitude or a power of the foregoing first signal to an amount corresponding to that of the foregoing second signal during a time period in which no near-end sound is detected and employed. Further, preferably, the third technology calculates an estimation value of a degree of the crosstalk of the echo from the foregoing first signal and the foregoing second signal for each frequency component of the foregoing first and second signals, and corrects the foregoing first signal based upon this calculated estimation value.

Further, in a fourth technology shown in Patent document 3, a constant based upon pre-measurement is employed as a coefficient of a degree of the crosstalk of the echo in the Patent document 2.

Patent document 1: JP-P1996-9005A
Patent document 2: JP-P2004-056453A
Patent document 3: International Laid-Open Publication WO2007/049643A1
Non-patent document 1: The paper "The hands-free telephone problem: an annotated bibliography update" by Eberhard Hansler, Annals of Telecommunications, 1994, pages 360 to 367.

DISCLOSURE OF THE INVENTION

Problems to be Solved by the Invention

Both of the first and second technologies are capable of sufficiently suppressing the echo when a non-linear element such as distortion generated in the echo path is sufficiently small. However, in an actual apparatus, the non-linear element such as the distortion generated in the loudspeaker is very large. The linear echo canceller cannot completely simulate the transfer function of the echo path containing the distortion because it is non-linear. In particular, when a small-sized loudspeaker that is employed in the mobile telephone or the like produce sound at a high volume level, the echo can be suppressed only at a volume level of 25 dB or so because the distortion of the loudspeaker is large. In this case, it becomes difficult to originate a call because the echo, which is sent to the far end as a near-end signal, is audible to the far-end speaker as well.

To the contrary, the third technology is capable of picking up the sound of which the echo has been sufficiently suppressed also when the distortion generated in the echo path is large. However, the method of calculating the estimation value of a degree of the echo crosstalk, which is used in the third technology, employs the sound detection result, and thus, when the sound is erroneously detected, the estimation value of a degree of the echo crosstalk contains a large error, and the corrected first signal that has been corrected based upon it is degraded. That is, the echo is not sufficiently suppressed or a large amount of the distortion is generated in the near-end sound. In particular, the echo is not sufficiently suppressed or a large amount of the distortion is generated in the near-end sound because a probability that the sound is erroneously detected in a situation in which the near-end noise is large is high.

With the fourth technology, the sound detection result is not influenced by the near-end noise because a constant based upon the pre-measurement is employed as a coefficient of a degree of the echo crosstalk. However, when the constant is employed as an estimation value of a degree of the echo crosstalk, the estimation value contains a large error and the corrected first signal that has been corrected based upon it is degraded because a change in the situation of the distortion of the echo due to aging leads to a change in a degree of the crosstalk of the echo.

The present invention has been accomplished in consideration of the above-mentioned problems, and an object thereof is to provide an echo suppression method and apparatus capable of sufficiently suppressing the echo in an environment in which the near-end noise exists also when a situation of the distortion generated in the echo path is changed.

Means to Solve the Problem

The present invention for solving the above-mentioned problems, which is a method of suppressing the echo caused by the acoustic system coupling between the sound pickup apparatus and the loudspeaker, is characterized in, detecting a time-changing minimum value of an amplitude ratio of a first signal, being either an output signal of the sound pickup apparatus or a signal obtained by subtracting an output signal of an echo canceller, which is generated based upon an input signal into the loudspeaker, from the output signal of the sound pickup apparatus to a second signal, being said output signal of the echo canceller; generating a value of a constant times the above detected minimum value as a crosstalk coefficient indicative of a degree of crosstalk of the echo; and correcting said first signal based upon the above generated crosstalk coefficient and said second signal.

The present invention for solving the above-mentioned problems, which is a apparatus for suppressing the echo caused by the acoustic system coupling between the sound pickup apparatus and the loudspeaker, is characterized in including a coefficient generator that detects a time-changing minimum value of an amplitude ratio of a first signal, being either an output signal of the sound pickup apparatus or a signal obtained by subtracting an output signal of an echo canceller, which is generated based upon an input signal into the loudspeaker, from the output signal of the sound pickup apparatus to a second signal, being said output signal of the echo canceller, and generates a value of a constant times the above detected minimum value as a crosstalk coefficient indicative of a degree of crosstalk of the echo; and a corrector that corrects said first signal based upon the crosstalk coefficient generated by the said coefficient generator and said second signal.

An Advantageous Effect of the Invention

As explained above, the present invention makes it possible to suppress the echo in an environment in which the near-end noise exists also when a situation of the distortion is changed. The reason is as follows.

When this echo canceller is a linear echo canceller, a harmonic wave component contained in the far-end signal almost directly appears in the output of the echo canceller. Further, the output of the echo canceller contains quite a few harmonic wave components contained in the far-end signal even when this echo canceller is a non-linear echo canceller. On the other hand, the near-end signal, being an input signal of the sound pickup apparatus, contains the echo of the far-end signal caused by the acoustic system coupling between the sound pickup apparatus and the loudspeaker, and the harmonic wave component generated by the non-linear component in addition to the near-end sound. This ratio of the harmonic wave components, namely, the value of a degree of the echo crosstalk due to the non-linear component becomes a value of a constant range as far as the limited purpose such as a voice call is concerned. The minimum value, out of the value of a constant range, is hardly influenced by the near-end sound and the near-end noise. Thus, using the value obtained by multiplying this minimum value or the value equivalent to the minimum value by a correction constant as a crosstalk coefficient and estimating an amount of the echo being contained in the first signal from the crosstalk coefficient and the second signal to subtract it from the first signal, or estimating a ratio of the near-end signal being contained in the first signal from the crosstalk coefficient and the first and second signals to multiply the first signal by this estimated ratio makes it possible to remove the non-linear component of the echo from the first signal. In such a manner, the error is made small even when the estimation is performed in an environment in which the near-end noise exists because the value equivalent to the minimum value is less influenced by the near-end noise, and as a result, the echo of which the distortion generated in the echo path is large can be sufficiently suppressed also in an environment in which the noise being contained in the near-end signal is large.

Figure 1:
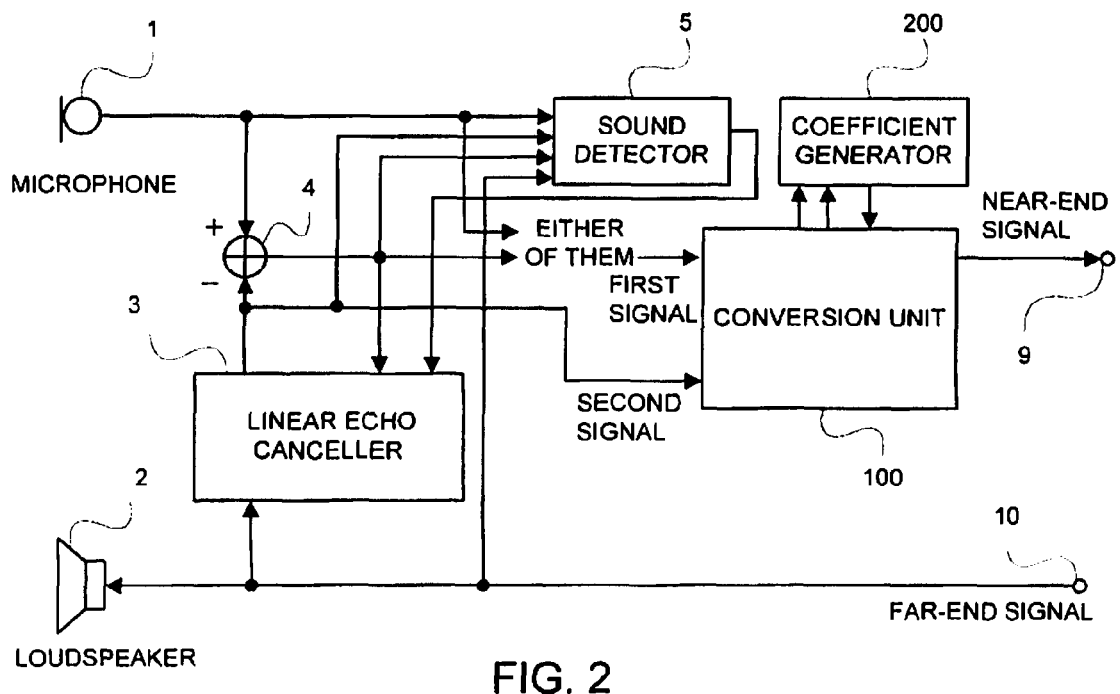
FIG. 1 is a block diagram illustrating an embodiment of the present invention.

DESCRIPTION OF NUMERALS 1 microphone
2 loudspeaker
3 linear echo canceller
4, 94$n$ (n=1 to N), 194$m$ (m=1 to M), 706, and 744 subtracters
5, 95$n$ (n=1 to N), and 195$m$ (m=1 to M) sound detectors
6 and 96$n$ (n=1 to N) spectral subtraction units
7 spectral suppression unit
30 adaptive filter
38 adaptive filter group
35, 37, 60, 61, 70, 71, 191, and 192 Fourier transformers
36, 64, 74, and 199 inverse Fourier transformers
66$m$ (m=1 to M) Fourier coefficient subtracters
91 and 92 subband analysis filter banks
93$n$ (n=1 to N), and 193$m$ (m=1 to M) echo canceller units
99 subband synthesis filter bank
100 conversion unit
160 and 161 frequency dividers
166$m$ (m=1 to M) corrector
164 frequency synthesizer
200 coefficient generator
201, 202, and 204 coefficient update storages
203 use condition detector
39M, 707, 737, and 746 multipliers
76$m$ (m=1 to M) Fourier coefficient multiplier
731 and 734 absolute value calculators
542 and 745 dividers
740, 741, 743, 747, and 748 smoothing units

BEST MODE FOR CARRYING OUT THE INVENTION

Embodiments of the present invention will be explained by making a reference to the accompanied drawings.

Upon making a reference to FIG. 1, the embodiment of the present invention includes a coefficient generator 200 for generating a coefficient indicative of a degree of the crosstalk of the echo (hereinafter, referred to as a crosstalk coefficient) for purpose of suppressing the echo caused by the acoustic system coupling between a microphone 1 and a loudspeaker 2, and a conversion unit 100 for inputting one of the output signal of the microphone 1 and a signal obtained by subtracting the output signal of a linear echo canceller 3 (the echo canceller could be a non-linear echo canceller) from the output signal of the loudspeaker 2 with a subtracter 4 as a first signal and the output signal of the linear echo canceller 3 as a second signal, inputting the crosstalk coefficient generated in the coefficient generator 200, and correcting the first signal based upon this inputted crosstalk coefficient and the second signal, thereby to generate the near-end signal, which is obtained by removing the echo from the first signal, and to output it to an output terminal 9.

Herein, the coefficient generator 200 inputs the first and second signals coming from the conversion unit 100, detects a time-changing minimum value of an amplitude ratio of the first signal to the second signal, and updates and generates the value of a constant times the detected minimum value as a newest crosstalk coefficient.

Further, preferably, the coefficient generator 200 receives the frequency component of the first signal and the frequency component of the second signal from the conversion unit 100, and updates/generates the crosstalk coefficient for each frequency component, and the conversion unit 100 corrects the first signal based upon the crosstalk coefficient corresponding to the above frequency component for each frequency component of the first signal. That is, the conversion unit 100 suppresses the residual echo based upon a correlation between an amplitude of the echo replica and an amplitude of the residual echo. A recursive coefficient of a correlation between an amplitude of the echo replica and an amplitude of the residual echo in an identical frequency can be regarded as a coefficient at which the echo replica has leaked into the residual echo, namely, a crosstalk coefficient. This crosstalk coefficient, which is settled within a constant range irrespective of male voice or female voice so long as the far-end signal is a sound signal, is approximated to the coefficient that is updated/generated for each frequency component in the coefficient generator 200.

More preferably, the coefficient generator 200 switches the crosstalk coefficients being updated/generated according to a change in the pre-decided use condition.

Figure 2:
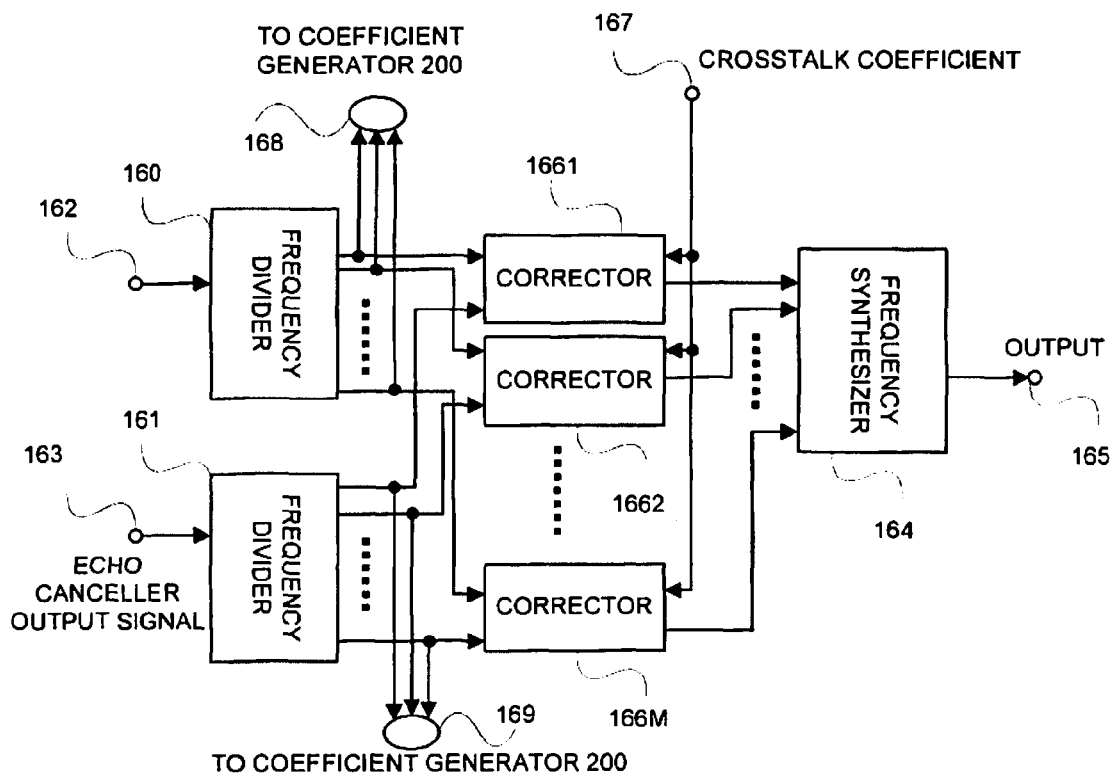
FIG. 2 is a block diagram illustrating an exemplary configuration of a conversion unit.

Upon making a reference to FIG. 2, the conversion unit 100 includes a frequency divider 160 for dividing the first signal, which is inputted from an input terminal 162, into M signals for each frequency, a frequency divider 161 for dividing the second signal, which is inputted from an input terminal 163, into M signals for each frequency, M correctors 166*m* (m=1 to M) mounted for each frequency, and a frequency synthesizer 164, the frequency divider 160 and the frequency divider 161 send the frequency-divided first signal and second signal to the correctors 166*m* corresponding to respective frequencies, each corrector 166*m* corrects the first signal based upon the crosstalk coefficient being supplied through an input terminal 167 from the coefficient generator 200, and the second signal, and outputs a correction result to the frequency synthesizer 164 and the frequency synthesizer 164 frequency-synthesizes the signal being outputted from each corrector 166*m* and outputs a synthesis result to an output terminal 165. Further, the first signal and the second signal frequency-divided by the frequency divider 160 and the frequency divider 161 are sent to the coefficient generator 200 through an output terminal 168 and an output terminal 169, respectively.

Herein, the corrector 166*m* may estimate an amount of the echo being contained in the first signal from the crosstalk coefficient indicative of a degree of the crosstalk of the echo being inputted from the input terminal 167 and the second signal to correct the first signal by subtracting this estimated amount of the echo from the first signal, or may estimate a ratio of the near-end signal being contained in the first signal from the crosstalk coefficient and the first and second signals to correct the first signal by multiplying the first signal by this estimated ratio.

As the frequency division in the frequency divider 160 and the frequency divider 161, arbitrary linear transforms such as a Fourier transform, a cosine transform, and an a subband analysis filter bank can be employed, and as the frequency synthesis in the frequency synthesizer 164, the arbitrary processes such as an inverse Fourier transform, an inverse cosine transform, and a subband synthesis filter bank corresponding hereto can be employed.

Figure 3:
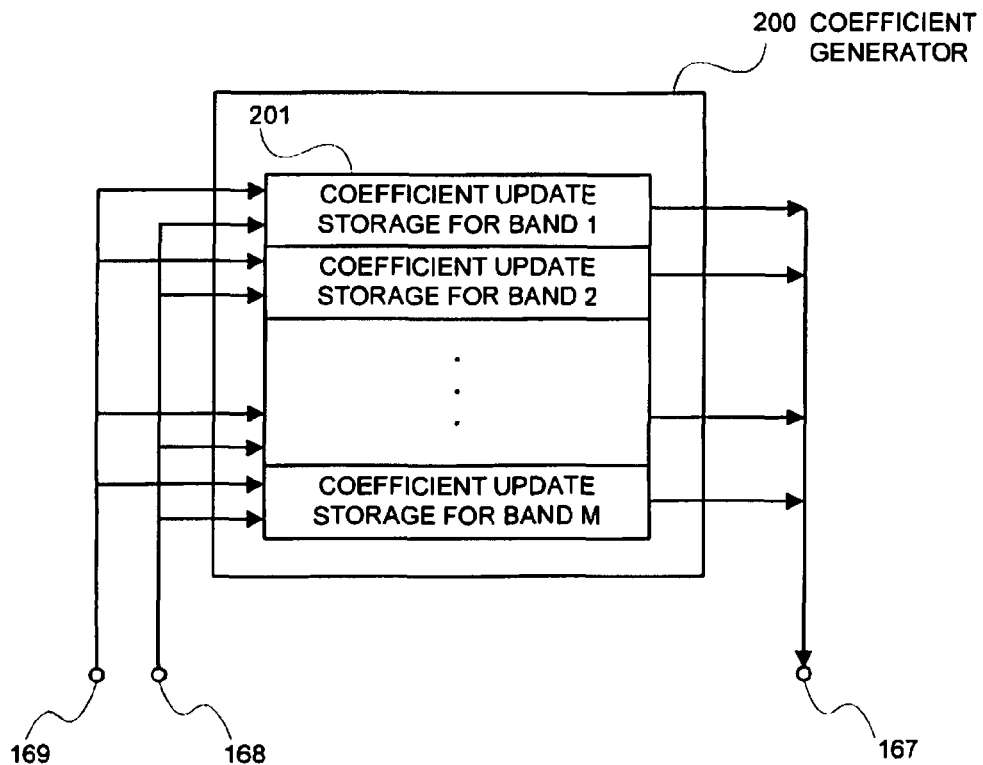
FIG. 3 is a block diagram illustrating an exemplary configuration of a coefficient generator.

Upon making a reference to FIG. 3, the coefficient generator 200 includes a coefficient update storage 201 for each band, and each coefficient update storage 201 receives the frequency component of the first signal from the terminal 168, and the frequency component of the second signal from the terminal 169, respectively, updates the crosstalk coefficient, generates the updated crosstalk coefficient, and sends it through the terminal 167 to the conversion unit 100.

Figure 4:
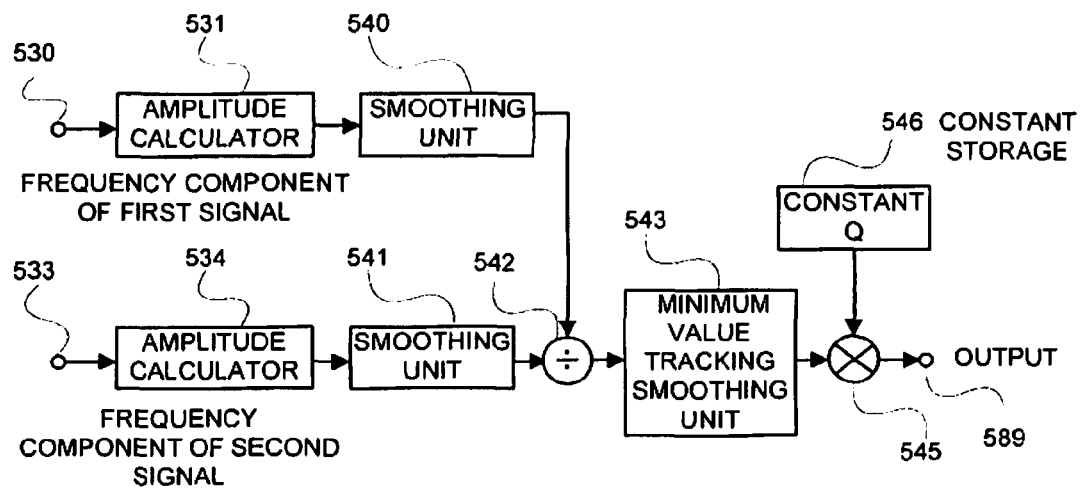
FIG. 4 is a block diagram illustrating an exemplary configuration of a coefficient update storage.

An exemplary configuration of the coefficient update storage 201 is shown in FIG. 4. In the coefficient update storage 201, the frequency component of the first signal inputted from an input terminal 530 is supplied as an amplitude or a power through an amplitude calculator 531 and a smoothing unit 540 to a divider 542. The frequency component of the second signal inputted from an input terminal 533 is supplied as an amplitude or a power through an amplitude calculator 534 and a smoothing unit 541 to the divider 542. The divider 542 sends a quotient of the amplitude or the power coming from the smoothing unit 540 divided by the amplitude or the power coming from the smoothing unit 541 to a minimum value tracking smoothing unit 543. The minimum value tracking smoothing unit 543 receives the quotient coming from the divider 542, performs asymmetrical smoothing (the smoothing in which the falling rate is fast and the rising rate is slow), and sends its result to a multiplier 545. The multiplier 545 multiplies the output value of the minimum value tracking smoothing unit 543 by a constant Q stored in a constant storage 546, and outputs its multiplication result as an updated crosstalk coefficient through a terminal 589 to the terminal 167.

Figure 5:
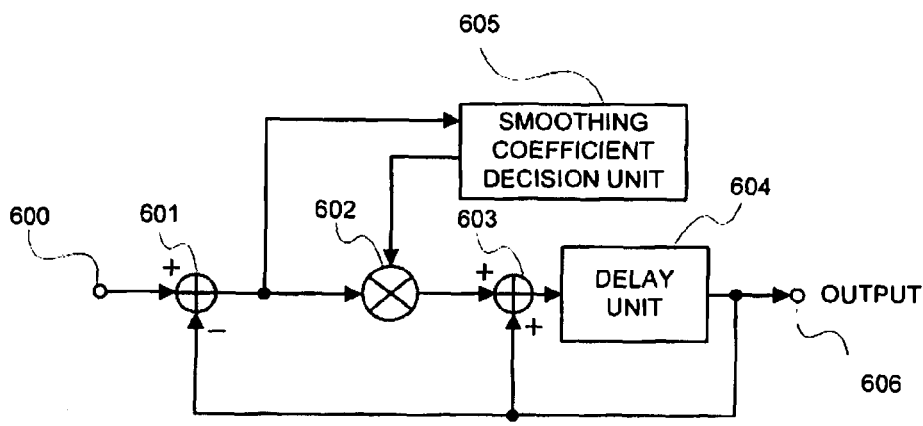
FIG. 5 is a block diagram illustrating an exemplary configuration of a minimum value tracking smoothing unit.

An exemplary configuration of the minimum value tracking smoothing unit 543 is shown in FIG. 5. In the minimum value tracking smoothing unit 543, the input signal (the output of the divider 542) is sent through a terminal 600 to a subtracter 601. The subtracter 601 receives the input signal received through the terminal 600, and the output of a one-sample delay unit 604 (the output of the smoothing unit itself), outputs a signal obtained by subtracting the output of the one-sample delay unit 604 from the input signal received through the terminal 600, and sends a result to a multiplier 602. The multiplier 602 receives the output signal of the subtracter 601, and a smoothing coefficient being generated by a smoothing coefficient decision unit 605, and sends a multiplication result of the above two to an adder 603. The adder 603 receives the output of the multiplier 602 and the output of the delay unit 604, and sends a addition result of the above two to the delay unit 604. The delay unit 604 receives the output of the adder 603, delays it by one sample, and sends its delay result to the suntracter 601, the adder 603, and an output terminal 606.

The minimum value tracking smoothing unit 543 shown in FIG. 5 constitutes a so-called leak integrator, or what is called a first-order IIR type low-pass filter. The smoothing coefficient decision unit 605 supplies a relative small coefficient, for example, 0.001 when the output signal of the subtracter 601 is positive, namely, the output is increasing, and supplies a relative large coefficient, for example, 0.1 when the output signal of the subtracter 601 is negative, namely, the input is smaller than the output, and the output is decreasing.

With these time-changing smoothing coefficients, the rate at which the value of the output terminal 606 of the smoothing unit is increased, namely, the rising rate becomes slow, and the rate at which the value is decreased, namely, the falling rate of the output becomes fast. As a result, the minimum value tracking smoothing unit 543 performs the asymmetrical smoothing in which the falling rate is fast and the rising rate is slow. This asymmetrical smoothing in which the falling rate is fast and the rising rate is slow is a minimum value tracking smoothing. The reason is that a role that the minimum value tracking smoothing plays is to output the value close to the above minimum value for the time being once the minimum value is inputted, and thus, the minimum value tracking smoothing unit has a function of extracting the value equivalent to the minimum value for a long time. The value obtained by multiplying the value equivalent to the minimum value outputted by performing this asymmetrical smoothing operation by the constant Q is employed as a crosstalk coefficient of the echo.

This embodiment differs from the third technology of calculating a degree of the crosswalk of the echo from the first and second signals when the near-end sound and the noise do not exist, and from the fourth technology of fixing the crosswalk coefficient of the echo as a constant in a point of employing as the a coefficient indicative a degree of the echo crosstalk the value of a constant times a ratio of magnitude of the frequency component between the first signal and the second signal for which the minimum value tracking smoothing has been performed. While it has been confirmed that the extent of a difference of a sound frequency spectral distribution between female voice and male voice enables a constant to be used as the crosstalk coefficient and the echo to be sufficiently suppressed so long as voice conversation is intended, both of the third technology and the fourth technology calculate the crosstalk coefficient of the echo from the signal that is gained in a quiet environment, or during a period when no near-end sound exists. To the contrary, this embodiment employs as the coefficient indicative of a degree of the echo crosstalk the value of a constant times a ratio of magnitude of the frequency component between the first signal and the second signal for which the minimum value tracking smoothing has been performed. The above advantageous effect will be explained.

Upon defining magnitude of the frequency component of the first signal and magnitude of the frequency component of the second signal as S and R, respectively, a value P5 of the constant Q times a value Pmin obtained by performing the minimum value tracking smoothing for a ratio of S and R is employed as a crosstalk coefficient of the echo. The minimum value tracking smoothing operation outputs the value that is smaller than an average of the input signals, and equal to or larger than the minimum value of the input signal. Now, for simplifying the explanation, think about the case that the minimum value tracking smoothing operation outputs the minimum value. Upon defining the echo component, and the component of the near-end sound and near-end noise, out of S, as E and N, respectively, Pmin is expressed as shown below. Where min[ ] and Av[ ] express a minimum value within a constant time, and an average value within a constant time, respectively.

$$P5 = P\min \times Q \qquad \text{(Equation 1)}$$

$$P\min = \min[Av[S]/Av[R]]$$
$$= \min[Av[E+N]/Av[R]]$$
$$\approx \min[Av[E]/Av[R]]$$

where the reason why Pmin is hardly influenced by N is that N, being the component of the near-end sound and near-end noise, almost hardly appears in the output of the minimum value tracking smoothing because N is not a component that endures for a long time, but a component that appears for a short time. This is an important property.

On the other hand, the following relation holds in a coefficient P0 indicative of a desired echo crosstalk coefficient and Pmin.

$$P0 = [Av[E]/Av[R]]$$

$$> \min[Av[E]/Av[R]]$$

$$\approx P\min \qquad \text{(Equation 2)}$$

Where [Av[E]/Av[R]] is nothing but the coefficient indicative of a desired degree of the echo crosstalk. However, the minimum value min[Av[E]/Av[R]] becomes a value smaller than the desired degree of the echo crosstalk coefficient [Av[E]/Av[R]] if not modified. Increasing it by a factor of the constant Q enables the modified P5 to be used as a more appropriate echo crosstalk coefficient instead of P0.

$$P1 \approx P5 = P\min \times Q \qquad \text{(Equation 3)}$$

As mentioned above, Pmin is hardly influenced by the near-end noise and near-end sound N, and yet a value that is inclined to be proportional to the coefficient indicative of a degree of the echo crosstalk. It can be seen that employing a value of the constant Q times Pmin instead of P1 makes it possible to update the coefficient that is hardly influenced by the near-end noise and near-end sound N and yet is indicative of a degree of the echo crosstalk. Thus, with this embodiment, it becomes possible to estimate the coefficient indicative of a degree of the echo crosstalk also when the situation of the distortion of the echo is changed in an environment in which the near-end noise exists, and yet to sufficiently suppress the echo to a level near to the level of the coefficient indicative of the desired degree of the echo crosstalk. This advantageous effect is an effect that the third technology and the fourth technology were not able to attain.

Figure 6:
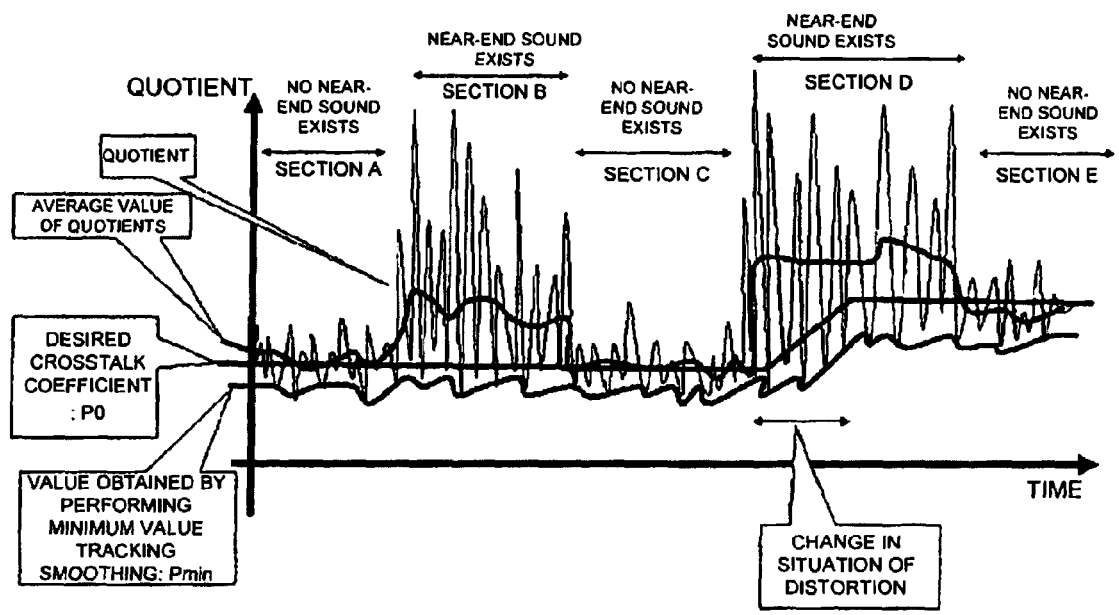
FIG. 6 is a schematic view for explaining an advantageous effect of the present invention.

FIG. 6 is a schematic view for explaining the above advantageous effect. In FIG. 6, the quotient is [Av[E]/Av[R]] in a certain frequency, and the figure shows a temporal change of the quotient. The desired crosstalk coefficient corresponds to P0. The value obtained by performing the minimum value tracking smoothing for the quotient corresponds to Pmin. The average of the quotients corresponds to an average value [Av[E]/Av[R]] that is employed in third technology.

FIG. 6 indicates the case that the near-head sound N appears in some cases and disappears in some cases, and yet, the situation of the distortion is changed in a section D in which the near-end sound exists. The desired crosstalk coefficient is increased in the section D.

The third technology employs the average value of the quotients that is obtained when the near-head sound N does not exist as the crosstalk coefficient. As shown in the figure, it can be seen that, in a section A, a section c, and a section E in which no near-head sound exists, the average value of the quotients, which is close to the desired crosstalk coefficient, can be employed as an approximate value. However, in a section B and a section D in which the near-head sound exists, the average value of the quotients cannot be employed as the crosstalk coefficient because it becomes a too large value. The third technology does not update the crosstalk coefficient in the section in which the near-end sound exists when the situation of the distortion is changed in the section D, whereby the too small value is employed as a crosstalk coefficient in the latter half of the section D, and as a result, the echo is not removed. The crosstalk coefficient cannot be updated and the echo cannot be appropriately removed even though the situation of the distortion is changed in an environment in which the near-end noise is large, and the extent in which the near-end sound is present is equivalent to being present any times. That is, it causes the echo to stay, or the near-end sound to be degraded.

To the contrary, the present invention employs the value of the constant Q times Pmin as the crosstalk coefficient. As apparent from the figure, Pmin is relatively insensible to existence or not of the near-end sound, and is changed in approximately proportion to a change in the desired crosstalk coefficient P0 also in the section D in which the near-end sound exists. By correcting Pmin by increasing it by a factor of the constant Q, it can be employed as an approximate value of the desired P0, and yet the echo can be appropriately removed also when the situation of the distortion is changed like the case of the section D.

The fourth technology employs the fixed and pre-decided value as the crosstalk coefficient. In addition, the fourth technology detects a "use condition" that allows the situation of the distortion, namely, the crosstalk coefficient to be changed, and selects and employs the crosstalk coefficient, thereby to remove the echo also when the situation of the distortion is changed. However, the echo cannot be appropriately removed when the situation of the distortion is changed due to time aging because the selected crosstalk coefficient is inappropriate. That is, it causes the echo to stay, or the near-end sound to be degraded. To the contrary, the present invention can remove the echo appropriately also when the situation of the distortion is changed due to the time aging because the present invention employs the appropriately-tracked crosstalk coefficient as the crosstalk coefficient.

As the constant Q for obtaining the value a constant times Pmin, for example, the average value of the ratios of P1(P0) and Pmin measured with an experiment or a simulation may be employed. Further, the identical value may be employed as the constant Q in all frequencies, and the different value may be employed frequency by frequency.

Figure 7:
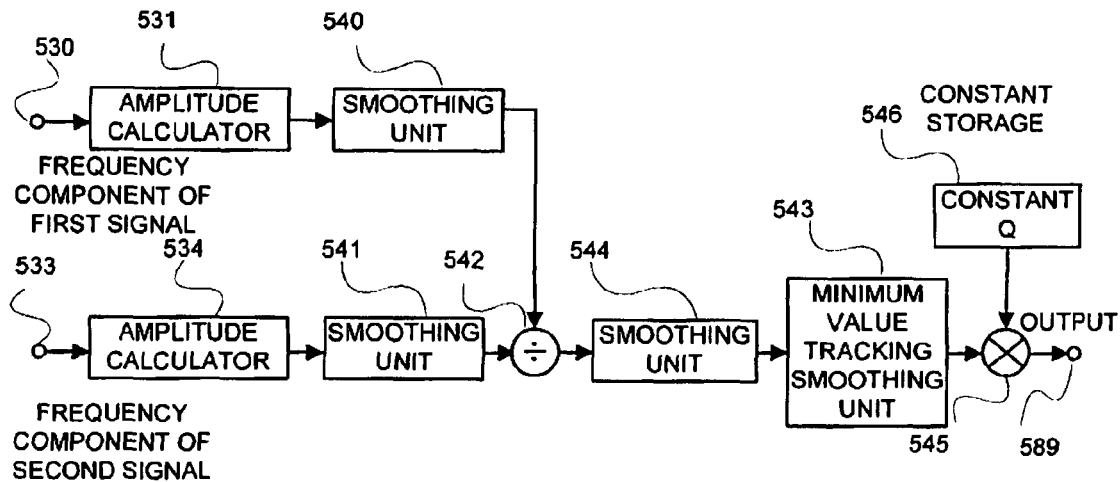
FIG. 7 is a block diagram illustrating another exemplary configuration of the coefficient update storage.

FIG. 7 is a block diagram illustrating another exemplary configuration of the coefficient update storage 201. A difference with the coefficient update storage 201 shown in FIG. 4 is that a smoothing unit 544 is inserted between the divider 542 and the minimum value tracking smoothing unit 543. The soothing constant of this smoothing unit 544 could be a symmetrical constant, and could be an asymmetrical constant in which the rising rate and the falling rate differ from each other. A time constant that is governed by the soothing constant of this smoothing unit 544 is shorter than that of the minimum value tracking smoothing unit 543 in both of the rising edge and the falling edge. The reason is to remove an influence upon trackability caused by inserting the smoothing unit 544 because the time constant of the smoothing unit 544 or the time constant of the minimum value tracking smoothing unit 543, which is larger, governs the tracking rate.

An advantageous effect of inserting the smoothing unit 544 will be explained in details. The foregoing FIG. 6 is a view schematically illustrated for a purpose of making an advantageous effect of the present invention easily understandable, and as a matter of fact, very rarely, there is the case that the minimum value becomes very small. In that case, in an exemplary configuration of the coefficient update storage 201 shown in FIG. 4, the coefficient being outputted by the minimum value tracking smoothing unit 543 becomes too small, and the echo crosstalk coefficient that is increased by a factor of the constant Q and is calculated becomes a value different somewhat from the desired crosstalk coefficient. However, in an exemplary configuration shown in FIG. 7, the signal inputted into the minimum value tracking smoothing unit 543 becomes slightly smooth, the minimum value becomes slightly large, and the fluctuation becomes small because the smoothing unit 544 is inserted. As a result, an favorable effect that a fluctuation in the coefficient being outputted by the minimum value tracking smoothing unit 543 become small, and the echo crosstalk coefficient being calculated based upon it is stabilized is gained.

Next, an exemplary configuration of switching the crosstalk coefficients that are updated/generated responding to a change in the pre-decided use condition will be explained in details.

As a rule, the distortion of the echo that cannot sufficiently be eliminated by the linear echo canceller 3 is roughly divided into the distorted sound that is generated from the loudspeaker 2 itself, and the distorted sound that is generated due to vibration of a housing in which the microphone 1 and the loudspeaker 2 have been mounted, and these distorted sounds are changed due to a change in the use condition of the apparatus, being a target of the echo suppression, in some cases. Thus, the crosstalk coefficients that are updated/generated in the coefficient generator 200 are preferably switched responding to the use condition.

Figure 8:
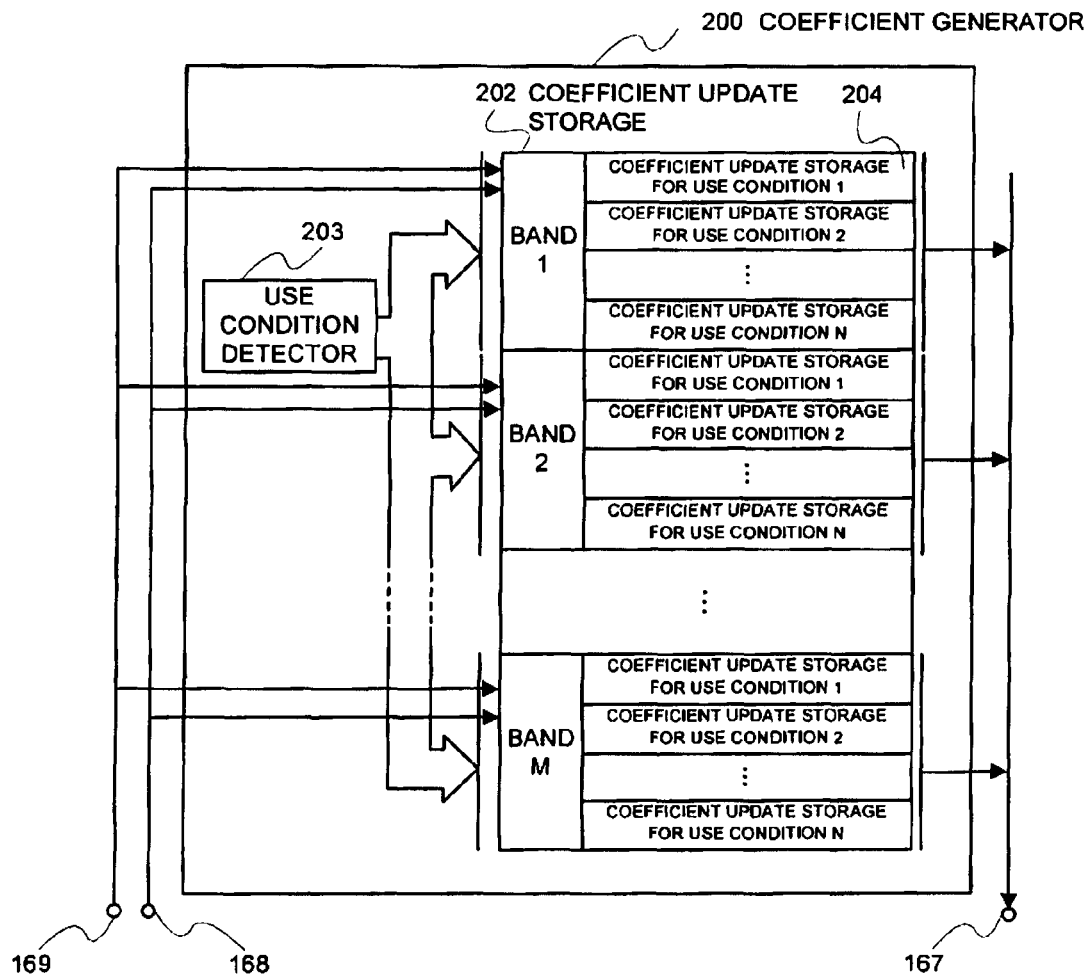
FIG. 8 is a block diagram illustrating another exemplary configuration of the coefficient generator.

An exemplary configuration of the coefficient generator 200 capable of switching the crosstalk coefficients, which are updated/generated, responding to the use condition is shown in FIG. 8. The coefficient generator 200 shown in FIG. 8 is configured of coefficient update storages 202 by each of the bands of a band 1 to a band M, each of which includes coefficient update storages 204 by use condition, and a use condition detector 203 for detecting the use condition of the apparatus, and selecting the coefficient update storage 204 corresponding to the detected use condition, out of the coefficient update storages 204 by use condition in each band, and the selected coefficient update storage 204 is configured to update the crosstalk coefficient based upon the first and second signals being inputted from the terminal 168 and the terminal 169, respectively, and to output the crosstalk coefficient to the terminal 167, and each of the remaining coefficient update storages 204, which have not been selected, is configured to preserve the value of the crosstalk coefficient updated just before.

Figure 9:
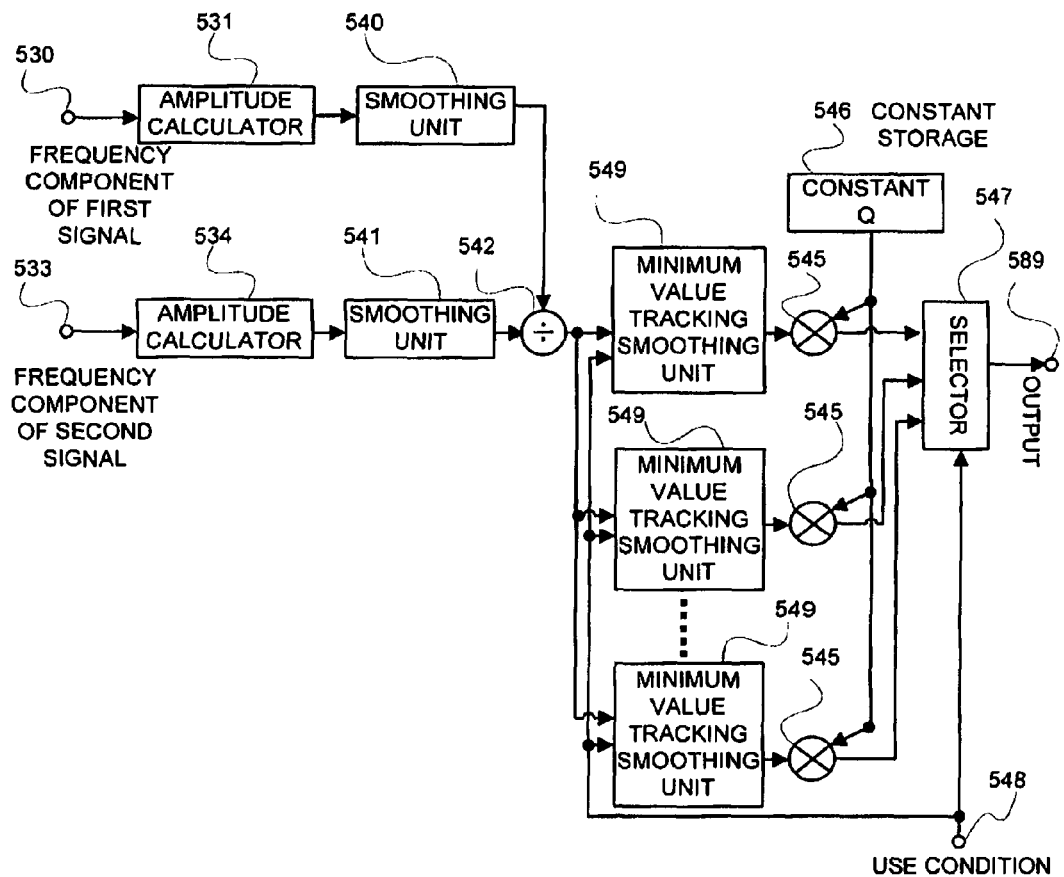
FIG. 9 is a block diagram illustrating another exemplary configuration of the coefficient update storage.

An exemplary configuration of the coefficient update storage 202 is shown in FIG. 9. A difference with the coefficient update storage 201 shown in FIG. 4 is that a set of a minimum value tracking smoothing unit 549 and a multiplier 545, of which the number is equivalent to that of the use conditions, is mounted, and a selector 547 for selecting the output of the multiplier 545 corresponding to the use condition, which is given by the use condition detector 203 through a terminal 548, out of a plurality of the multipliers 545, and sending it to the terminal 589 is mounted.

Figure 10:
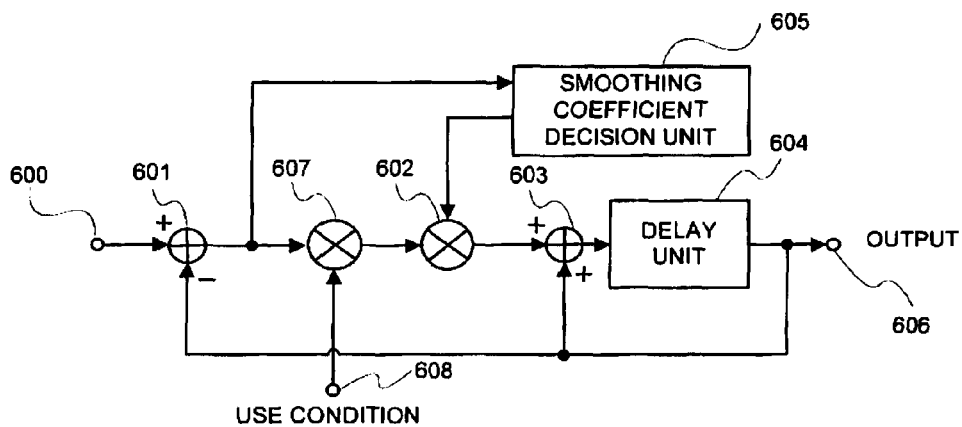
FIG. 10 is a block diagram illustrating another exemplary configuration of the minimum value tracking smoothing unit.

An exemplary configuration of the minimum value tracking smoothing unit 549 is shown in FIG. 10. A difference with the minimum value tracking smoothing unit 543 shown in FIG. 5 is to include a terminal 608 for inputting the use condition value, which is 1 when the use condition corresponding to this minimum value tracking smoothing unit 549 has been detected, and is 0 otherwise, from the use condition detector 203, and a multiplier 607 for multiplying the output of the subtracter 601 by the use condition value inputted from the terminal 608, and outputting its multiplication result to the multiplier 602, which is mounted between the subtracter 601 and the multiplier 602. This minimum value tracking smoothing unit 549 performs an operation basically identical to the operation of the minimum value tracking smoothing unit 543 shown in FIG. 5 when the use condition corresponding to this minimum value tracking smoothing unit 549 has been detected by the use condition detector 203 because the use condition value being inputted from the terminal 608 becomes 1. To the contrary, the minimum value tracking smoothing unit 549 continues to keep the before-update value when the use condition corresponding to this minimum value tracking smoothing unit 549 has not been detected by the use condition detector 203 because the use condition value being inputted from the terminal 608 becomes 0, and the output value of the adder 603 becomes identical to the output value of the delay unit 604. In this case, a loop structure of the adder 603 and the delay unit 604 constitutes a storage means.

Next, the use condition that is detected by the use condition detector 203 will be described in details with the mobile telephone apparatus exemplified.

Figure 11:
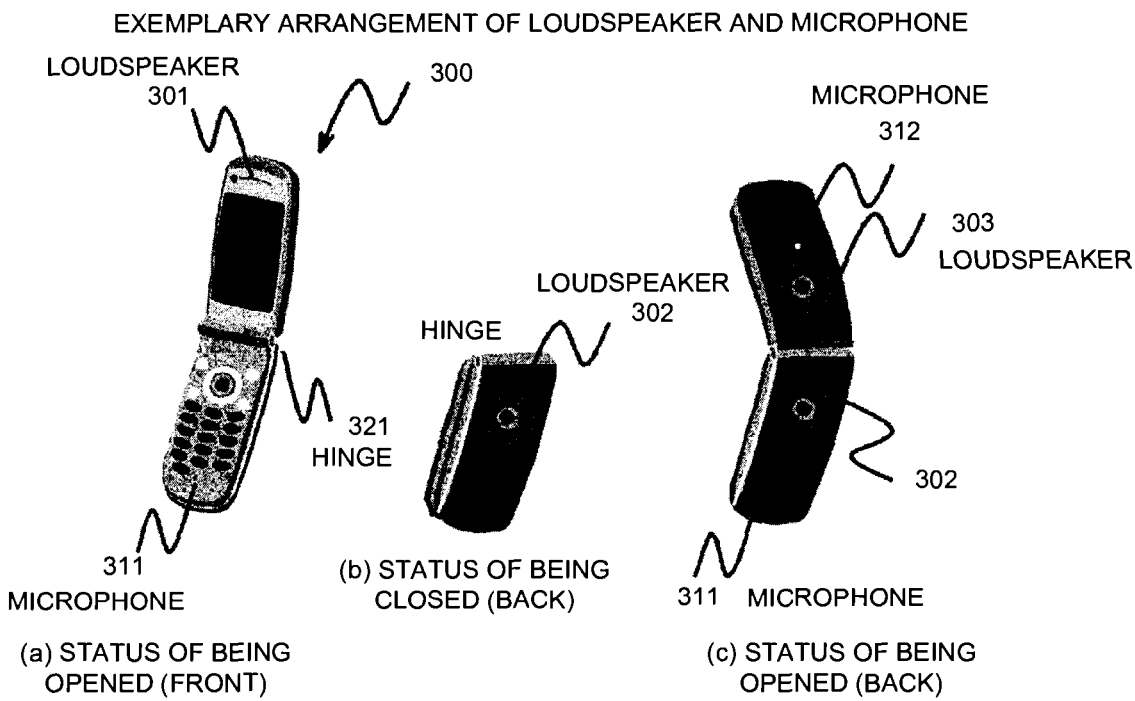
FIG. 11 is an outline oblique perspective view illustrating an exemplary arrangement of the microphone and the loudspeaker in the folding-type mobile telephone apparatus.

The cause of the distorted sound being generated from the loudspeaker 2 lies in non-linearity of a loudspeaker characteristic. Thus, as shown in FIG. 11, in a mobile telephone apparatus 300 that appropriately switches and uses a plurality of loudspeakers 301 to 303, the distortion of the echo differs depending upon which loudspeaker is employed when the characteristics of the individual loudspeakers differ from each other. In this case, it is detected which loudspeaker is employed as a use condition, and the crosstalk coefficients are switched responding to the loudspeaker that is being used.

Further, also in the cased that the number of the installed loudspeaker 2 is 1, the distortion of the echo is changed when a positional relation with the microphone 1 differs because the extent to which the distorted sound generated in the loudspeaker 2 arrives at the microphone 1 is changed. Thus, a relative position of the loudspeaker 2 and the microphone 1 is checked as a use condition, and the crosstalk coefficients are switched responding to the relative positional. Specifically, a rotary angle of a hinge 321 is detected as a use condition, and switchover to the crosstalk coefficients, which corresponds to the rotary angle, is made because a relative position of the loudspeaker 2 and the microphone 1 is governed to some extent by the rotary angle of the hinge 321 in the folding-type mobile telephone apparatus 300 shown in FIG. 11. Further, with the mobile telephone apparatus that appropriately switches and uses a plurality of microphones 311 and 312 as shown in FIG. 11, it is detected as a use condition which microphone is being employed, and switchover to the crosstalk coefficients corresponding to the microphone that is being used is made because a relative position with the loudspeaker 2 is changed depending upon the microphone that is being used.

On the other hand, the distorted sound resulting from the vibration of the housing is primarily generated at a joint that connects the parts. The sound outputted from the loudspeaker 2 causes the housing to vibrate, the distorted sound is generated from a joint that connects the parts, and this is inputted into the microphone 1 as the distortion of the echo.

When the sound level of the loudspeaker 2 is changed, the acoustic energy being transmitted to the housing is changed, the extent of the vibration of the housing is changed, and the distorted sound being generated at a joint that connects the parts is changed. Thus, a configuration is also thinkable in which the sound level setting of the loudspeaker 2 is detected as a use condition, and the crosstalk coefficients are switched according to the sound level setting.

Further, with the folding-type mobile telephone apparatus 300 as shown in FIG. 11, the extent of the vibration of the housing is changed and the distorted sound that is generated at a joint that connects the parts is changed because a contact situation between an upper part and a lower part is changed depending upon whether or not it has been folded completely. Thus, it is detected as a use condition whether or not the folding-type mobile telephone apparatus has been completely folded, and the crosstalk coefficients are switched responding to a detection result. Further, with the folding-type mobile telephone apparatus 300, the acoustic energy that transmits to another location of the housing is changed, and the distorted sound that is generated at a joint that connects the parts is changed when a relative position between the loudspeaker and another location of the housing is changed. The rotary angle of the hinge 321 is detected as a use condition, and the crosstalk coefficients are switched responding to the rotary angle because a relative position between the loudspeaker and another location of the housing is governed to some extent by the rotary angle of the hinge 321 in the mobile telephone apparatus 300. Additionally, the detection as to whether or not the sliding operation has been performed, and the sliding amount can be employed as a use condition in the sliding-type mobile telephone apparatus instead of the detection as to whether or not the folding operation has been completely performed and the angle of the hinge, which are employed for the folding-type mobile telephone apparatus. Needless to say, with the mobile telephone apparatus having both of a sliding mechanism and a folding mechanism, both of these mechanisms can be employed as a use condition. With the mobile telephone apparatus that is neither of a sliding-type nor of a folding-type, the use condition, which influences a change in the joint that connects the parts within the housing, and a change in the sound level of the echo, is detected, and the crosstalk coefficients are switched responding to its detection result.

Figure 12:
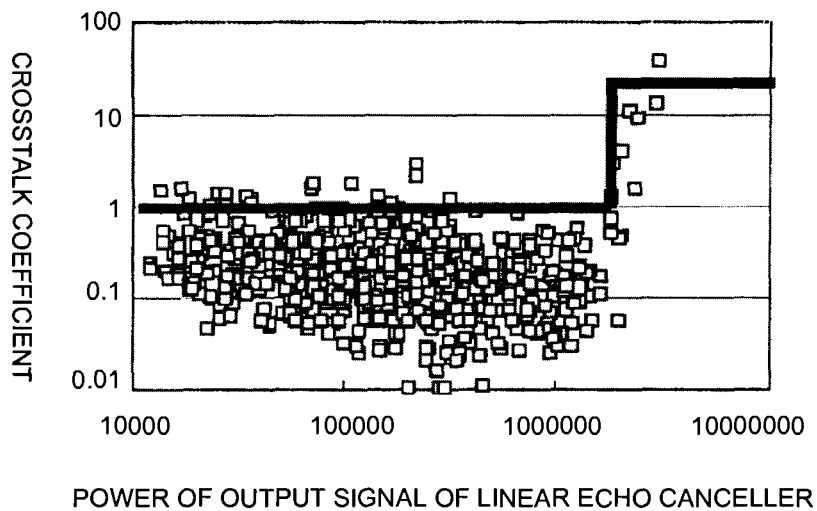
FIG. 12 is a view illustrating an experiment result of investigating a correlation between the power and the crosstalk coefficient of the output signal of the linear echo canceller.

In addition, the present inventor has experimentally confirmed that an increase in the power or the amplitude of the output signal of the linear echo canceller 3 leads to an increase in the non-linearity of the echo path. That is, upon generating the distorted echo in a situation in which no near-end signal existed at all, and investigating a relation between the crosstalk coefficient that was able to sufficiently suppress the echo, and the power of the output signal of the linear echo canceller 3 with respect to the frequency band centered around 1875 Hz, the result as shown in FIG. 12 was gained. In FIG. 12, a traverse axis indicates the power of the output signal of the linear echo canceller 3, and a longitudinal axis indicates the crosstalk coefficient that can sufficiently suppress the echo. As seen from a distribution of plotted points, the crosstalk coefficient is rapidly changed with the location as a turning point in which the value of the power of the output signal of the linear echo canceller 3 reaches 2000000. The reason is that the distortion of the echo is believed to be abruptly increased due to the non-linearity of the loudspeaker characteristics because when the power of the output signal of the linear echo canceller 3 is large, the input signal of the linear echo canceller 3, namely, the power of the far-end signal being applied to the loudspeaker 2 is also large. Thus, the power or the amplitude of the output signal of the linear echo canceller 3 is detected as a use condition, and the crosstalk coefficients are switched responding to its detection result, and are separately updated/generated. Additionally, the power or the amplitude of the far-end signal, and the power or the amplitude of a specific frequency component of the far-end signal can be employed instead of the power or the amplitude of the output signal of the linear echo canceller 3.

The method of employing the power or the amplitude of the output signal of the linear echo canceller 3 or the like as a use condition resembles the method of employing the sound level setting of the loudspeaker 2 as a use condition, and while there exists in the latter method a possibility that the coefficient for sufficiently suppressing the echo is erroneously selected if the sound volume level setting is large also in the case that no far-end signal exists and the echo does not need to be suppressed, the former method is superior to the latter method in a point that such a possibility does not exist.

All of the use conditions explained above do not need to be employed, and one or plural major use conditions, out of them, is detected and employed. Further, it is also possible to detect the use condition with an indirect method in addition to the direct detection of the corresponding use condition. For example, when a television telephone communication is made by use of the mobile telephone apparatus equipped with a plurality of cameras, information of the camera, which is currently being employed, is detected instead of directly detecting the microphone or the loudspeaker, which is currently being employed, if a configuration is made so that the microphone or the loudspeaker for use is automatically switched depending upon the camera for use.

Further, the use conditions such as the hinge angle, the loudspeaker sound volume level, the loudspeaker for use, which can be detected outside the echo suppression apparatus, out of the use conditions, can be also detected by the external apparatus to input them into the coefficient generator 200, and use condition information, which is less influenced by the noise being contained in the near-end signal, for example, the power or the amplitude of the far-end signal, the power or the amplitude of the output signal of the linear echo canceller 3, and the power or the amplitude of a specific frequency component of the far-end signal can be also detected within the coefficient generator 200.

In such a manner, with this embodiment, obtaining the coefficient indicative of a degree of the echo crosstalk by performing the minimum value tracking smoothing for a ratio of magnitude of the first signal and the second signal makes it possible to suppress the echo all the more also when a property of the distortion of the echo is changed in an environment in which the near-end sound and the near-end noise exit, as compared with the case of the fourth technology.

Next, examples of the present invention will be explained by making a reference to the accompanied drawings. At first, the example employing the spectral subtraction unit as the conversion unit 100 of FIG. 1 will be explained.

First Example

Figure 13:
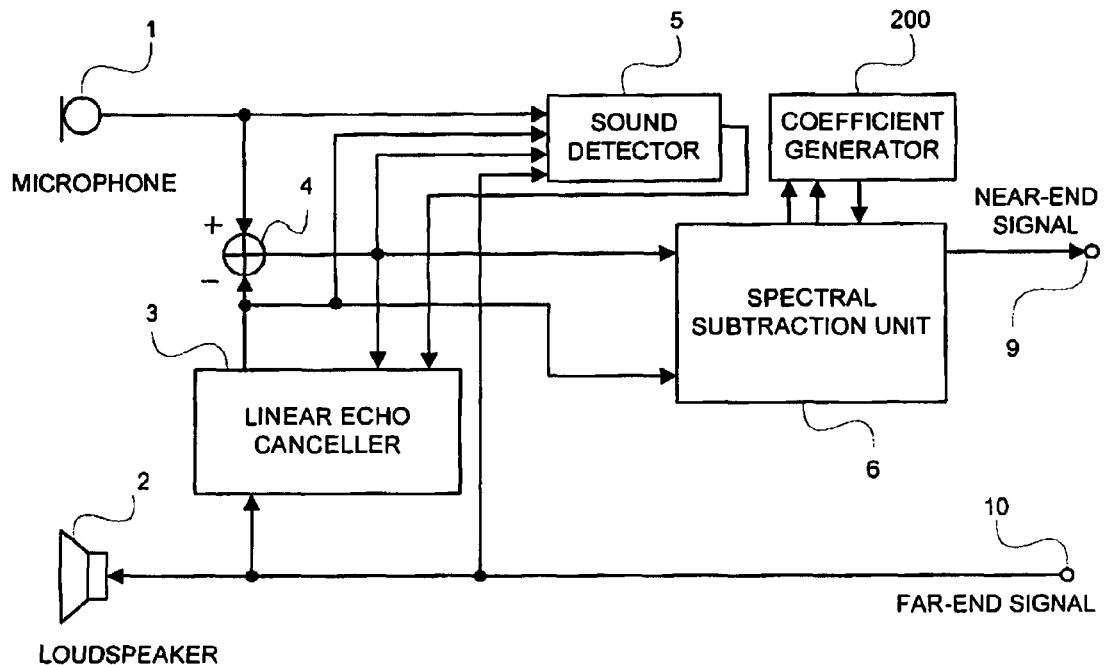
FIG. 13 is a block diagram illustrating a first example of the present invention.
Figure 30:
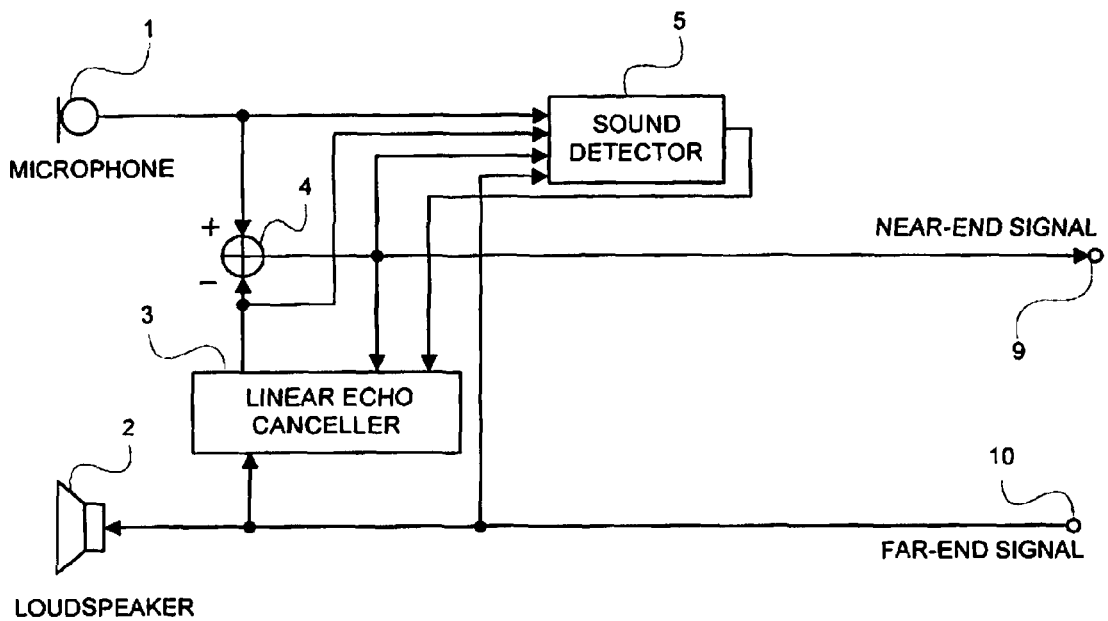
FIG. 30 is a block diagram illustrating an echo removal method.
Figure 31:
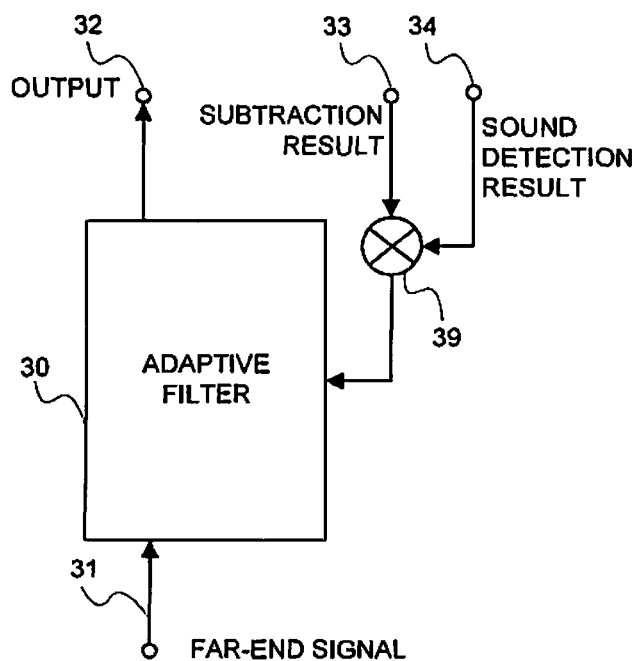
FIG. 31 is a block diagram illustrating a configuration of the linear echo canceller.

FIG. 13 is a block diagram of the first example of the present invention. A difference with the technology shown in FIG. 30 is that the coefficient generator 200 is mounted, a spectral subtraction unit 6 is inserted between the subtracter 4 and the output terminal 9 of the near-end signal of FIG. 30, and the above spectral subtraction unit 6 receives the output signal of the linear echo canceller 3, and yet receives the crosstalk coefficient being outputted by the coefficient generator 200.

The coefficient generator 200 generates the coefficient indicative of a degree of the echo crosstalk. The spectral subtraction unit 6 develops the output signal of the subtracter 4 and the output signal of the linear echo canceller 3 into respective frequency domains, and removes the echo frequency by frequency. Hereinafter, exemplary configurations and operations of the coefficient generator 200 and the spectral subtraction unit 6 will be explained in its order.

<Coefficient Generator 200>

The coefficient generator 200, for example, as shown in FIG. 3, can be configured of the by-band coefficient update storages 201. In this case, the first and second frequency components being inputted from the terminal 168 and the terminal 169, respectively, are given by the spectral subtraction unit 6, and the by-band crosstalk coefficient is given to the spectral subtraction unit 6 through the terminal 167.

Further, the coefficient generator 200, for example, as shown in FIG. 8, can be configured of the by-band coefficient update storages 202, each of which includes the coefficient update storages 204 by use situation, and the use condition detector 203. In this case, the first and second frequency components being inputted from the terminal 168 and the terminal 169, respectively, are given by the spectral subtraction unit 6, and the by-band crosstalk coefficient is given to the spectral subtraction unit 6 through the terminal 167. The followings can be utilized as a use condition.

One example of the use condition is the sound volume level of the loudspeaker 2. In this case, the use condition detector 203, for example, includes a sensor for detecting the sound volume level of the loudspeaker 2, and a discrimination unit for performing a threshold determination for the detected sound volume level and converting it into a digital value that is binary or more.

Another example of the use condition is the rotary angle of the hinge in the folding-type mobile telephone apparatus. In this case, the use condition detector 203 includes a sensor for detecting the rotary angle of the hinge, and a discrimination unit for performing a threshold determination for the detected rotary angle and converting it into a digital value that is binary or more.

Another example of the use condition is a selection status of the loudspeaker in the mobile telephone apparatus equipped with a plurality of the loudspeakers. In this case, the use condition detector 203 includes a determination unit for determining which loudspeaker is employed, and outputting a determination result as a digital value that is binary or more.

Another example of the use condition is a selection status of the microphone in the mobile telephone apparatus equipped with a plurality of the microphones. In this case, the use condition detector 203 includes a determination unit for determining which microphone is employed, and outputting a determination result as a digital value that is binary or more.

Another example of the use condition is the power or the amplitude of the output signal of the linear echo canceller 3. In this case, the use condition detector 203 includes a detector for detecting the power or the amplitude of the output signal of the linear echo canceller 3, and a discrimination unit for performing a threshold determination for the detected power or amplitude and converting it into a digital value that is binary or more. For example, with the case of FIG. 12, the crosstalk coefficient is rapidly changed from 1 to 20 when the power of the output signal of the linear echo canceller 3 reaches 2000000, whereby a configuration is made so that the threshold is set to 2000000, the digital value of 0 is outputted when it is 2000000 or less, and the digital value of 1 is outputted when it exceeds 2000000.

Besides, an arbitrary thing that exerts an influence upon a degree of the echo crosstalk can be used as a use condition. Further, a plurality of the use conditions can be also combined and employed.

<Spectral Subtraction Unit 6>

Figure 14:
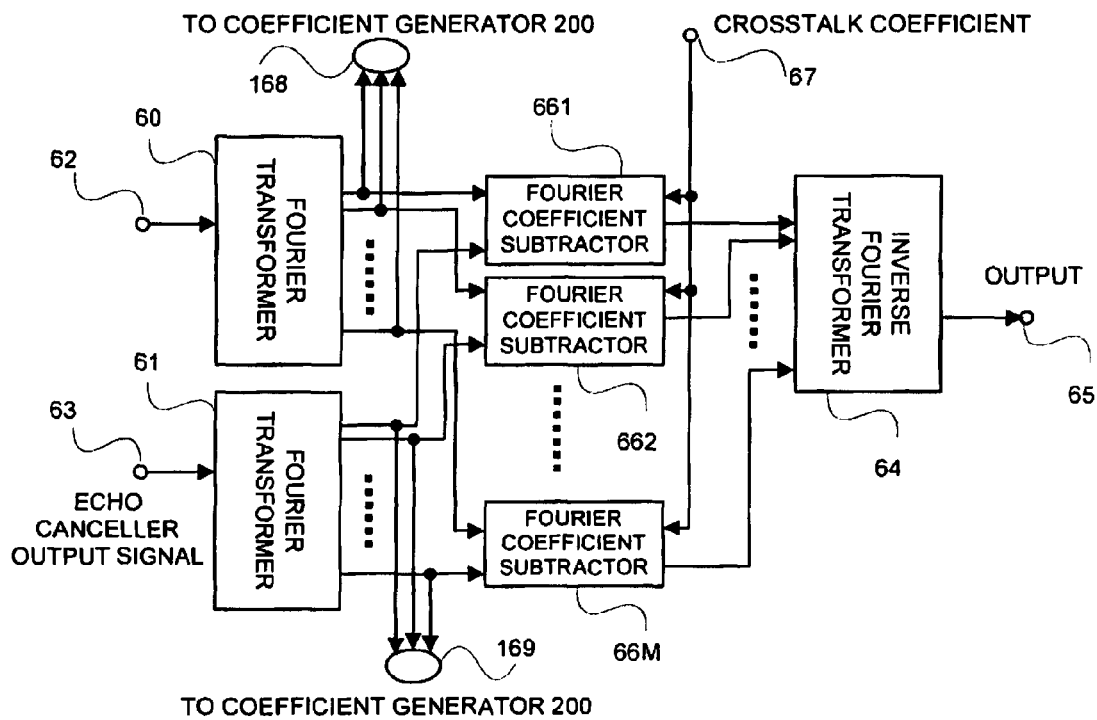
FIG. 14 is a block diagram illustrating an exemplary configuration of a spectral subtraction unit.

FIG. 14 is a block diagram illustrating an exemplary configuration of the spectral subtraction unit 6. The output signal of the subtracter 4 in FIG. 13 is inputted from an input terminal 62. A Fourier transformer 60 receives the signal inputted from the input terminal 62, calculates an M-point Fourier transform thereof, sends a calculated result (amplitude and phase) as a first Fourier coefficient to Fourier coefficient subtracters 66m (m=1 to M) that correspond to respective frequencies, and simultaneously therewith, sends it to the coefficient generator 200 through the terminal 168. On the other hand, the output signal of the linear echo canceller 3 in FIG. 13, namely, the echo replica signal is inputted from an input terminal 63. A Fourier transformer 61 receives the signal inputted from the input terminal 63, calculates an M-point Fourier transform thereof, sends a calculated result (amplitude and phase) as a second Fourier coefficient to the Fourier coefficient subtracters 66*m* that correspond to respective frequencies, and simultaneously therewith, sends it to the coefficient generator 200 through the terminal 169.

The Fourier coefficient subtracter 66*m* receives the first Fourier coefficient outputted by the Fourier transformer 60, the second Fourier coefficient outputted by the Fourier transformer 61, and the crosstalk coefficient (terminal 67) outputted by the coefficient generator 200 in FIG. 13, calculates the Fourier coefficient of which the echo component has been removed by performing a subtraction process for an amplitude part, and sends a calculation result (amplitude and phase) to an inverse Fourier transformer 64. The inverse Fourier transformer 64 receives a Fourier coefficient group outputted by the Fourier coefficient subtracters 661 to 66M, calculates an inverse Fourier transform thereof, and outputs a real number part of the calculation result from an output terminal 65.

Figure 15:
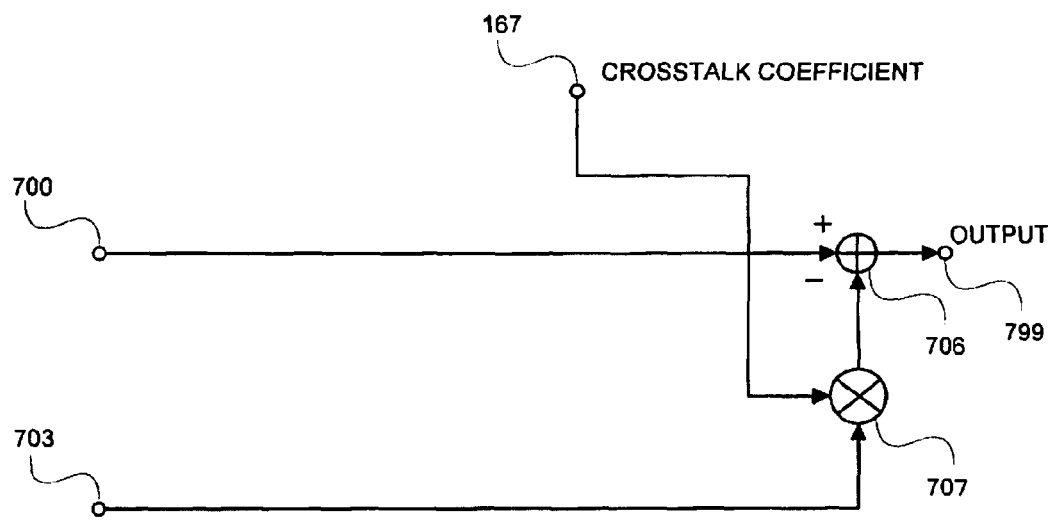
FIG. 15 is a block diagram illustrating a first exemplary configuration of a Fourier coefficient subtracter.

Next, an exemplary configuration and an operation of each of Fourier coefficient subtracters 66*m* (m=1 to M) will be explained by employing FIG. 15. FIG. 15 is a block diagram illustrating a first exemplary configuration of the Fourier coefficient subtracter 66*m* (m=1 to M). The by-frequency first Fourier coefficient outputted by the Fourier transformer 60 in FIG. 14 is sent to a subtracter 706 through a terminal 700. The second Fourier coefficient outputted by the Fourier transformer 61 in FIG. 14 is sent to a multiplier 707 through a terminal 703. The crosstalk coefficient inputted from the terminal 67 in FIG. 14 is sent to the multiplier 707 through the terminal 167.

The multiplier 707 multiplies the crosstalk coefficient inputted from the terminal 167 by the second Fourier coefficient received from the Fourier transformer 61 through the terminal 703, and sends a result to the subtracter 706. The subtracter 706 subtracts the value being outputted by the multiplier 707 from the first Fourier coefficient received from the Fourier transformer 60 through the terminal 700, and outputs a calculation result through a terminal 799. The calculation result outputted through the terminal 799 is sent to the inverse Fourier transformer 64 in FIG. 14.

Herein, the multiplier 707 multiplies the crosstalk coefficient inputted from the terminal 167 by the Fourier coefficient of the output signal of the linear echo canceller, thereby to obtain an estimation value of the Fourier coefficient of the echo signal that stays in the echo replica signal. The subtracter 706 subtracts this estimation value of the Fourier coefficient of the echo signal from the Fourier coefficient of the near-end signal, thereby to obtain an estimation value of the Fourier coefficient of the near-end signal of which the echo component has been suppressed. The above estimation value is sent to the inverse Fourier transformer 64 in FIG. 14, is synthesized into the near-end signal, and is outputted from the output terminal 65. Resultantly, the echo is suppressed in this synthesized near-end signal.

An operation of the Fourier coefficient subtracter 66*m* mentioned above will be explained by employing an equation. The Fourier coefficient of the near-end signal, the component of the near-end sound, out of it, the echo component, and the noise component are defined as S, A, E, and N, respectively. The following equation holds with these.

$$S = A + E + N \quad \text{(Equation 4)}$$

Further, the Fourier coefficient of the far-end signal is defined as R. In addition, the value of the crosstalk coefficient inputted from the terminal 167 is defined as P1. This value P1 is approximated to a ratio of the far-end signal R, which leaks as an echo, over an entirety of the far-end signal R, and is a gain of the echo in the echo path. Incidentally, the value P1 is calculated by the following equation in the third technology.

$$P1 = Av[S/R] = Av[(E+N)/R] \quad \text{(Equation 5)}$$

where $Av[\cdot]$ indicates the smoothing.

Thus, multiplying this P1 by R provides a result P2 (equivalent to the output of the multiplier 707), which is an estimation value of the echo component.

$$\begin{aligned} P2 &= P1 \times R \\ &= Ex[E] \end{aligned} \quad \text{(Equation 6)}$$

where $Ex[\cdot]$ indicates the estimation value.

Subtracting this P2 from S A provides a result P3 (equivalent to the output of the subtracter 706), which behaves like the following.

$$\begin{aligned} P3 &= S - P2 \\ &= S - P1 \times R \\ &= A + E + N - Ex[E] \\ &= Ex[A + N] \end{aligned} \quad \text{(Equation 7)}$$

The estimation value of a sum of the Fourier coefficient component A of the near-end sound and the noise component N, of which the echo component E has been removed, is gained in this P3.

Now returning to FIG. 13, how the example of the present invention operates when the distortion exists in the loudspeaker etc. in the echo path will be explained. With the example of the present invention, when the distortion exists, the spectral subtraction unit 6 performs a non-linear arithmetic operation in the frequency domain, thereby to remove the component caused by the distortion in the echo. The linear echo canceller 3 regulates a temporal change in the signal component that is important in the non-linear arithmetic operation of the frequency domain, thereby to effectively remove the component caused by the distortion in the echo. The output signal of the microphone 1 contains the echo of the distortion of the far-end signal besides the far-end signal itself. This echo of the distortion can be regarded as a harmonic wave of the frequency component of the echo of the far-end signal. So as to simplify the explanation, think about the case that the echo component E is a harmonic wave caused by the distortion. As apparent from the Equation 6, the spectral subtraction unit 6, in principle, can remove the echo component E so long as the Fourier coefficient component R of the far-end signal is not zero. Herein, what is important for removing the echo component E is a precision of the crosstalk coefficient P1 of the echo in the echo path.

While the third technology estimates P1 in the section in which no near-end sound exists based upon the sound detection result, P1 that the third technology estimates becomes a large value in an environment in which the near-end noise is large, and P3 calculated based upon the erroneous P1 is degraded. That is, a large amount of the distortion is generated in the near-end sound. So as to avoid this problem, the fourth technology employs a fixed value as P1; however P1 contains a large error when a degree of the echo crosstalk fluctuates due to the time aging etc. and thus, P3 based upon this is degraded.

On the other hand, in this example, the foregoing coefficient that is employed as P1 is a value of a constant times the value obtained by performing the minimum value tracking smoothing for a quotient of an absolute value of the foregoing second signal divided by an absolute value of the foregoing first signal. As explained previously, this P1 is hardly influenced by the near-end noise N, and yet is close to an accurate value of the crosstalk coefficient of the echo. In accordance with the experiment conducted by this inventor with the mobile telephone as a hands-free telephone set, a result that P1 tracked a change in the time aging and a change in the use condition, and both of a suppression degree of the echo and a distortion feeling of the near-end sound were satisfactory was obtained.

Further, in the first example of the present invention, there also exists an advantageous effect of removing the residual echo even when the linear echo canceller 3 of FIG. 13 has erroneously estimated the echo path. While the case that the echo component E was a harmonic wave due to the distortion was listed in the foregoing explanation so as to simplify the explanation, the discussion is similar also when the echo component of the far-end signal not caused by the distortion, namely, the echo component that is not harmonic wave exists, and the echo component that is not harmonic wave can be suppressed. For example, the case that the echo path is erroneously estimated, and the subtracter 4 of FIG. 13 does not remove the echo, but adds the echo the other way about is thinkable. However, also in that case, the spectral subtraction unit 6 removes the component of the far-end signal, thereby enabling the echo to be suppressed.

Further, by employing this advantageous effect owing to the 2-input spectral subtraction unit 6, a reduction in the arithmetic amount resulting from a reduction in the number of taps of the linear echo canceller 3 is enabled. A reduction in the number of taps leads to a decline in the echo removal amount when the linear echo canceller 3 is employed as shown in FIG. 30. However, in the first example of the present invention shown in FIG. 13, a decrease in the echo removal amount is small even though the number of the taps is reduced, and a practical echo removal amount is gained.

As explained above, in the first example of the present invention, combining the linear echo canceller 3 and the non-linear arithmetic operation of the frequency domain by the spectral subtraction unit 6 allows weak points thereof to be compensated for each other, and a high performance to be attained. That is, existence of the spectral subtraction unit 6 can lead to the suppression of the echo at a high volume level also in the case that the echo cannot be sufficiently suppressed only with the linear echo canceller 3, for example, in the case that the distortion exists in the echo path, and in the case that the linear echo canceller 3 has erroneously estimated the echo path. Further, employing the output of the linear echo canceller makes it possible to suppress the harmonic wave responsible for the distortion by using a simple estimation of the amplitude without considering a temporal shift that cannot be settled with the arithmetic operation of the frequency domain by the spectral subtraction unit 6.

In addition, employing as P1 in the spectral subtraction unit 6 the coefficient having the foregoing pre-decided value, being a value a constant times of the value obtained by performing the minimum value tracking smoothing for a quotient of an absolute value of the foregoing second signal divided by an absolute value of the foregoing first signal, makes it possible to sufficiently suppress the echo and to gain the less-degraded near-end sound also when the status of the distortion of the echo is changed in an environment in which the near-end noise is large.

Second Example

Figure 16:
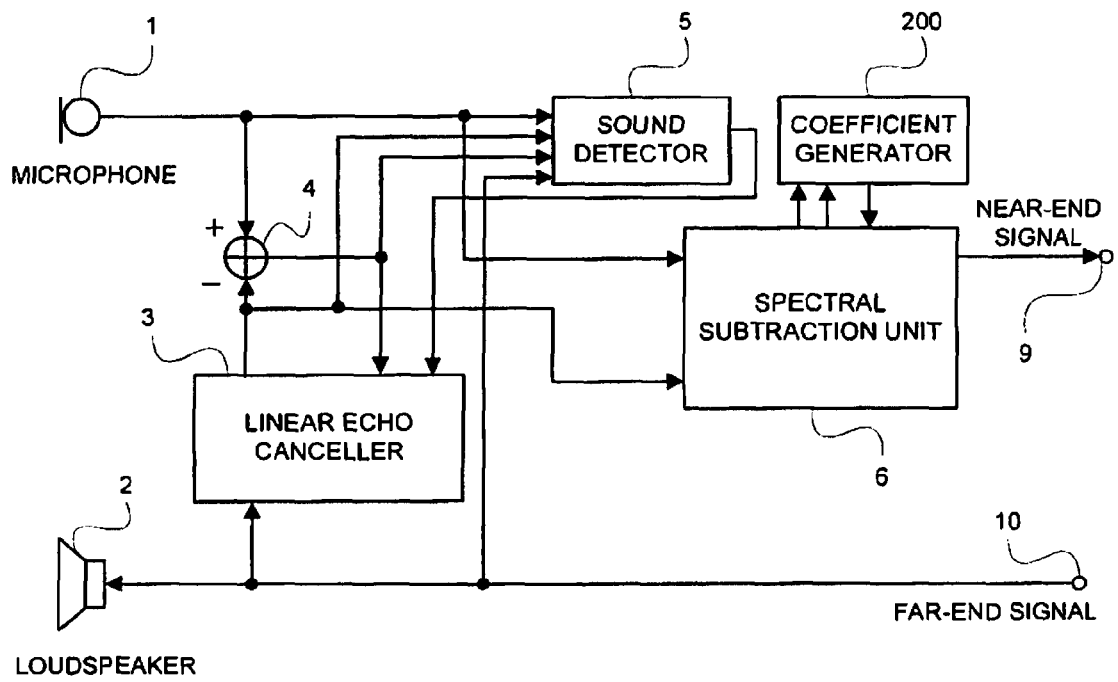
FIG. 16 is a second example of the present invention.

FIG. 16 is a block diagram of the second example of the present invention. A difference with the first example shown in FIG. 13 is that while, as a signal being inputted into the spectral subtraction unit 6, the output of the subtracter 4 is employed in the first example, the output signal of the microphone 1 is employed in the second example. While the main component of the echo has been removed by the linear echo canceller 3 in the output of the subtracter 4, the echo has not been removed in the output signal of the microphone 1. This difference is a difference as to whether the removal of the main component of the echo is performed by the linear echo canceller 3 and the subtracter 4 or by the spectral subtraction unit 6, and the second example is completely identical to the first example in an advantageous effect for the distortion. Thus, also in the second example, the suppression of the echo can be suppressed at a high volume level also in the case that the echo cannot be sufficiently suppressed only with the linear echo canceller 3, for example, in the case that the distortion exists in the acoustic system, and in the case that the linear echo canceller 3 has erroneously estimated the echo path.

In addition, employing as the crosstalk coefficient P1 for use in the spectral subtraction unit 6 the value updated/generated responding to the use condition makes it possible to sufficiently suppress the echo and to gain the less-distorted near-end sound also when the situation of the distortion of the echo is changed in an environment in which the near-end noise is large.

Additionally, as the configuration of the spectral subtraction unit 6 in the first and second examples, besides the exemplary configurations explained so far, a configuration of Spectral Subtraction described in the paper "Acoustical Echo Cancellation Over A Non-Linear Channel" by Xiaojian lu, and Benoit Champagne, which appeared in 2001 in International Workshop on Acoustic Echo and Noise Control (hereinafter, referred to as Non-patent document 2), and a configuration of Spectral Subtraction described in "A Speech Enhancement System Based On Negative Beamforming And Spectral Subtraction" by A. Alvarez et al., which appeared in 2001 in International Workshop on Acoustic Echo and Noise Control (hereinafter, referred to as Non-patent document 3), can be also employed.

Further, as the configuration of the echo canceller 3 in the first and second examples, besides the linear echo canceller explained so far, a configuration of the echo canceller by C. Faller, which appeared in 2005 in IEEE Transactions on Speech and Audio Processing (hereinafter, referred to as Non-patent document 4), can be also employed. This case is equivalent to employment of the value obtained by adding 1 to the echo crosstalk coefficient P1 of the present invention as a value that is called an oversubtraction factor in the Non-patent document 4. That is, it can be said that the present invention proposes the method of setting an appropriate separate value frequency by frequency as an oversubtraction factor.

Further, as a configuration of the echo canceller 3, a configuration in which an adaptive volterra filter is employed, and a configuration in which a neural network is employed can be employed.

Third Example

Next, an example employing a spectral suppression unit as the conversion unit 100 of FIG. 1 will be explained.

Figure 17:
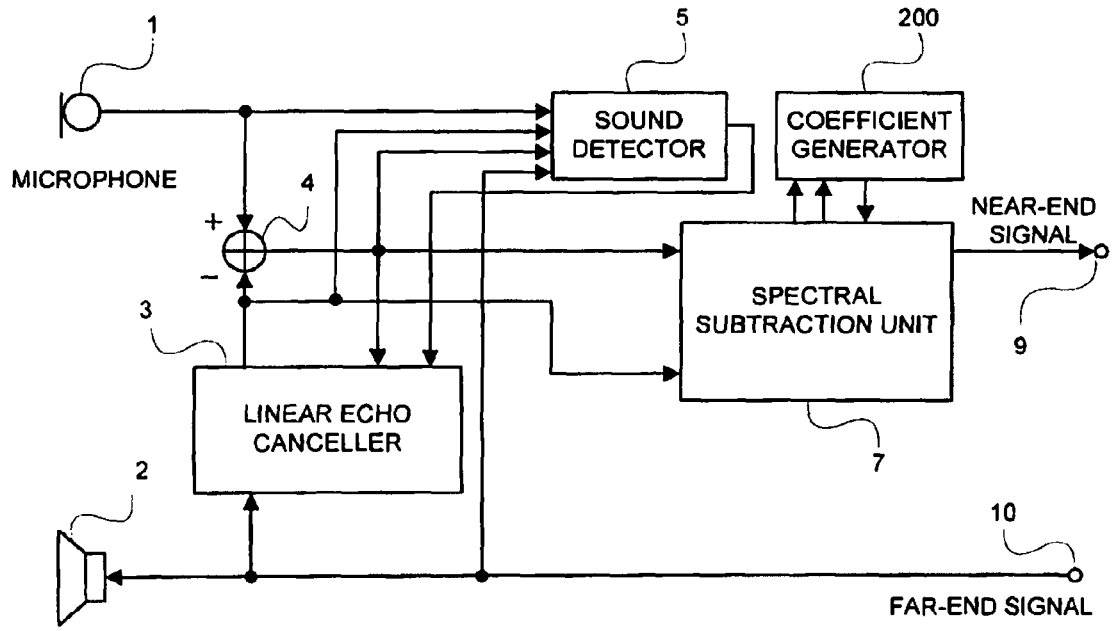
FIG. 17 is a block diagram illustrating a third example of the present invention.

FIG. 17 is a block diagram of the third example of the present invention. A difference with the first example shown in FIG. 13 is that the spectral subtraction unit 6 is replaced with a spectral suppression unit 7. The spectral suppression unit 7 will be explained by employing the figure.

Figure 18:
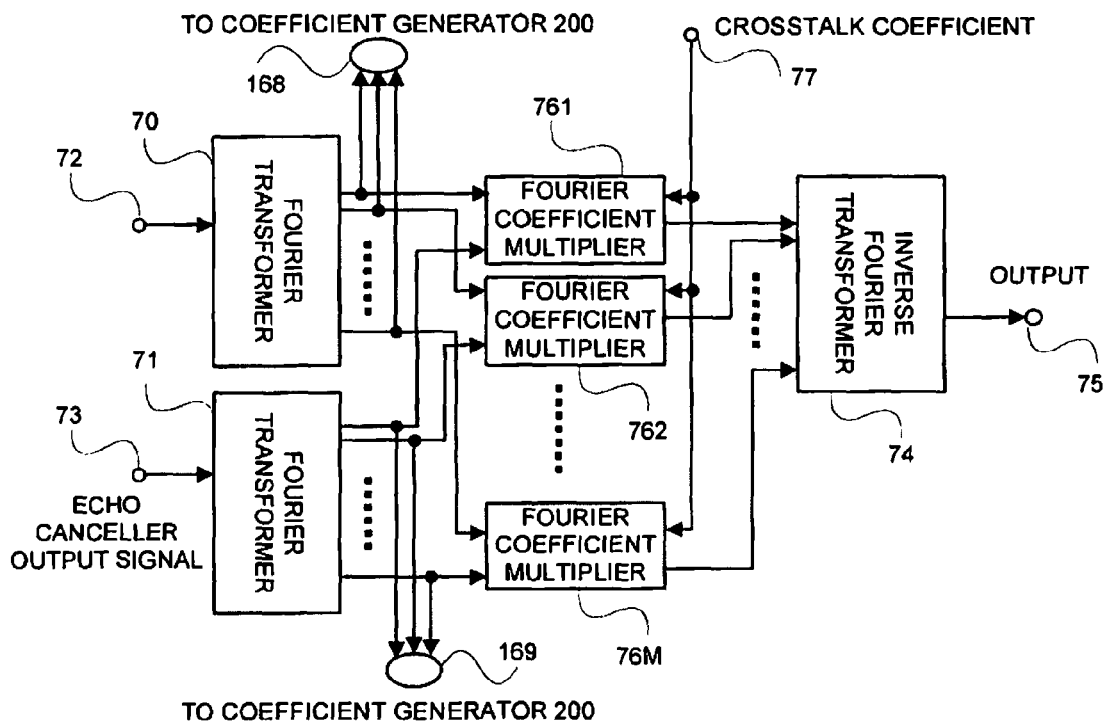
FIG. 18 is a block diagram illustrating an exemplary configuration of the spectral suppression unit.

FIG. 18 is a block diagram illustrating the spectral suppression unit 7. The output signal of the subtracter 4 of FIG. 17 is inputted from an input terminal 72. A Fourier transformer 70 receives the signal inputted from the input terminal 72, calculates an M-point Fourier transform thereof, sends a calculated result (amplitude and phase) as a first Fourier coefficient to Fourier coefficient multipliers 76m (m=1 to M) that correspond to respective frequencies, and simultaneously therewith, sends it to the coefficient generator 200 through the terminal 168. On the other hand, the output signal of the linear echo canceller 3 of FIG. 17 is inputted from an input terminal 73. A Fourier transformer 71 receives the output signal of the linear echo canceller inputted from the input terminal 73, calculates an M-point Fourier transform thereof, sends a calculated result (amplitude and phase) as a second Fourier coefficient to Fourier coefficient multipliers 76m that correspond to respective frequencies, and simultaneously therewith, sends it to the coefficient generator 200 through the terminal 169. The Fourier coefficient multiplier 76m receives the first Fourier coefficient outputted from the Fourier transformer 70, the second Fourier coefficient outputted from the Fourier transformer 71, and the crosstalk coefficient outputted by the coefficient generator 200 of FIG. 17 from a terminal 77, calculates the Fourier coefficient of which the echo component has been reduced by performing a multiplication process for the amplitude part, and sends a calculated result (amplitude and phase) to an inverse Fourier transformer 74. The inverse Fourier transformer 74 receives a Fourier coefficient group outputted by the Fourier coefficient multiplier 76m (m=1 to M), calculates its inverse Fourier transform, and outputs an real number part of a calculation result from a output terminal 75. The output terminal 75 gains the signal of which the echo component has been reduced by the Fourier coefficient multiplier 76m (m=1 to M).

Figure 19:
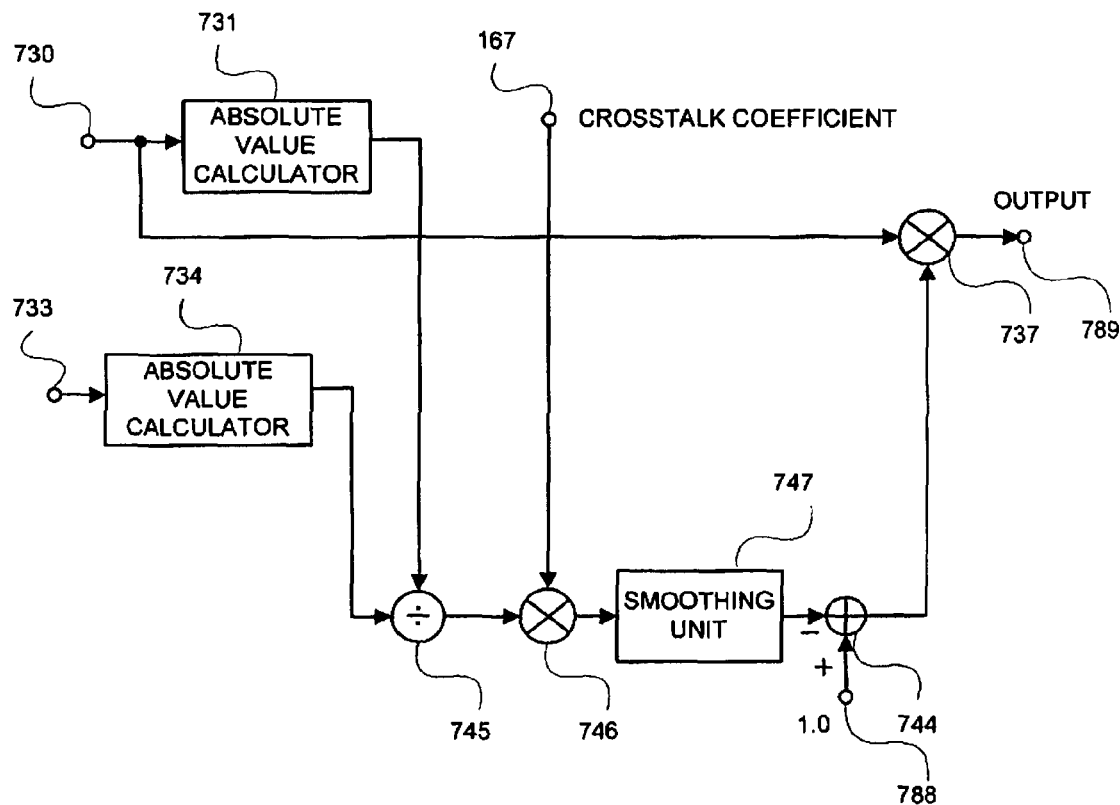
FIG. 19 is a block diagram illustrating a first exemplary configuration of a Fourier coefficient multiplier.

Next, a configuration and an operation of each Fourier coefficient multiplier 76m (m=1 to M) will be explained by employing FIG. 19. FIG. 19 is a view illustrating a first exemplary configuration of the Fourier coefficient multiplier 76m (m=1 to M). The by-frequency first Fourier coefficient outputted by the Fourier transformer 70 of FIG. 18 is sent through a terminal 730 to an absolute value calculator 731 and a multiplier 737. The second Fourier coefficient outputted by the Fourier transformer 71 of FIG. 18 is sent through a terminal 733 to an absolute value calculator 734. The absolute value calculator 731 receives the first Fourier coefficient, calculates its absolute value, and sends it to a divider 745. The absolute value calculator 734 receives the second Fourier coefficient, calculates its absolute value, and sends it to the divider 745.

The divider 745 receives the calculation result by the absolute value calculator 731, and the calculation result by the absolute value calculator 734, calculates the value of the calculation result by the absolute value calculator 734 divided by the calculation result by the absolute value calculator 731, and sends a calculation result to a multiplier 746.

The multiplier 746 receives the crosstalk coefficient inputted from the terminal 167, and the output of the divider 745, calculates the multiplication value of these two, and sends a calculation result to a smoothing unit 747. The smoothing unit 747 receives the output of the multiplier 746, smoothes its output, and sends a result to a subtracter 744. The subtracter 744 subtracts a calculation result by a smoothing unit 747 from 1.0, and sends a result to a multiplier 737. The multiplier 737 multiplies the value being outputted by the subtracter 744 by the value of the first Fourier coefficient received through the terminal 730 from the Fourier transformer 70, and outputs a calculation result through a terminal 789. The calculation result outputted through the terminal 789 is sent to the inverse Fourier transformer 74 of FIG. 18.

Figure 20:
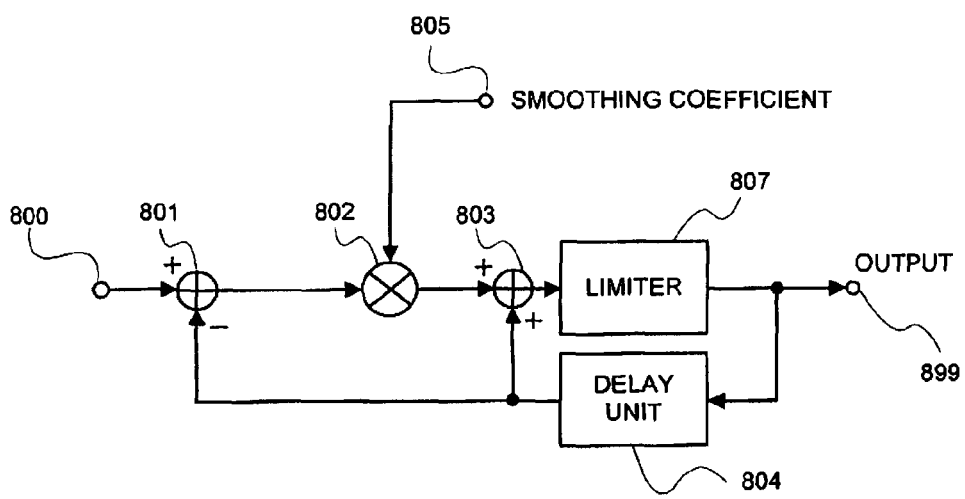
FIG. 20 is a block diagram illustrating an exemplary configuration of the smoothing unit within the Fourier coefficient multiplier.

An exemplary configuration of the smoothing unit 747 is shown in FIG. 20. The input signal (output of the multiplier 746) is sent through a terminal 800 to a subtracter 801. The subtracter 801 receives the input signal received through the terminal 800 and the output of a one-sample delay unit 804 (output of the smoothing unit itself), outputs the signal obtained by subtracting the output of the one-sample delay unit 804 from the input signal received through the terminal 800, and sends a result to a multiplier 802. The multiplier 802 receives the output signal of the subtracter 801, and a smoothing coefficient being given through a terminal 805, and sends a multiplication result of these two to an adder 803. The adder 803 receives the output of the multiplier 802, and the output of the delay unit 804, sends an addition result of these two to a limiter 807. The limiter 807 receives the output of the adder 803, limits an upper limit and a lower limit so that the above value does not exceed a certain range, and sends a restriction result to an output terminal 899 and the delay unit 804. The delay unit 804 receives the output of the limiter 807, delays it by one sample, and sends its delay result to the subtracter 801 and the adder 803. The smoothing unit 747 shown in this example constitutes a so-called leaky integrator, or what is called a primary IIR type low-pass filter. Additionally, the smoothing coefficient and the time constant of the smoothing become inversely proportional to each other. Besides, the smoothing unit 747 assumes an arbitrary configuration having an advantageous effect of the smoothing, for example, an advanced IIR type filter.

Figure 21:
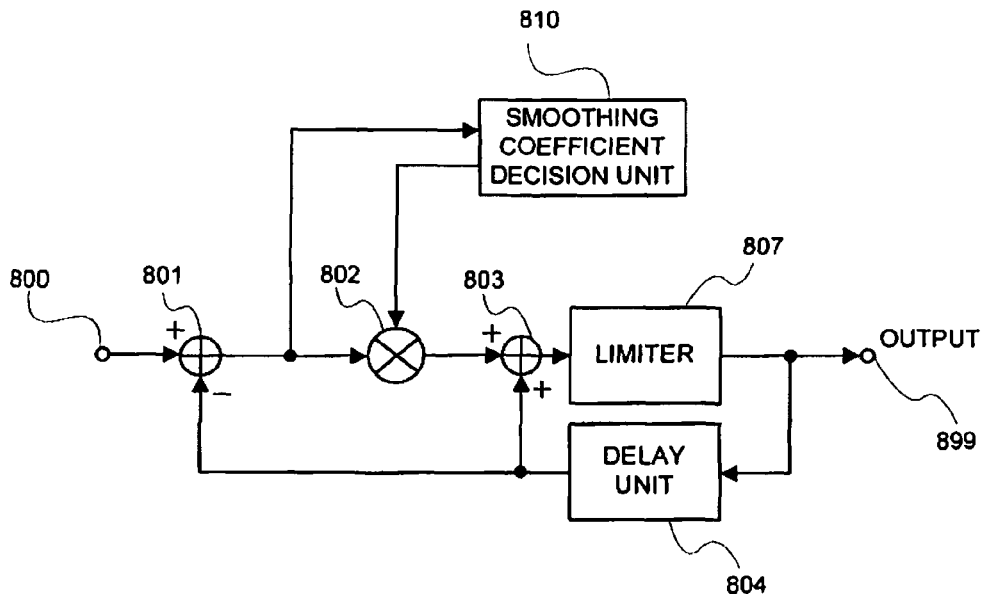
FIG. 21 is a block diagram illustrating another exemplary configuration of the smoothing unit within the Fourier coefficient multiplier.

Another exemplary configuration of the smoothing unit 747 is shown in FIG. 12. A difference with the smoothing unit shown in FIG. 20 is that the smoothing coefficient being supplied to the multiplier 802 is supplied from a smoothing coefficient decision unit 810 having the output signal of the subtracter 801 as an input. With this, the time constant of the smoothing of the rising edge and that of the falling edge can be made asymmetrical with each other in the exemplary configuration shown in FIG. 21. The smoothing coefficient decision unit 810 supplies a relative large coefficient, for example, 0.01 when the output signal of the subtracter 801 is positive, namely, the output is increased, and supplies a relative small coefficient, for example, 0.001 when the output value of the subtracter 801 is negative, namely, the input is smaller than the output and the output is decreased. With these time-changing smoothing coefficients, the rate at which the value of the output terminal 899 of the smoothing unit is increased, namely, the rising rate becomes fast, and the rate at which the value is decreased, namely, the falling rate of the output becomes slow. As a result, in the value being outputted by the subtracter 744 of FIG. 19, namely, in the estimation value of a ratio of the near-end sound and near-end noise in the near-end signal, the rising rate becomes fast, and the rate at which the value is decreased, namely the falling rate of the output becomes slow. With a change in the amplitude of the actual sound and the music, namely, with an envelope, the rising rate is fast, and the falling rate is slow in many cases. The exemplary configuration of the smoothing unit shown in FIG. 21 makes it possible to generate such an envelope, and to enhance an estimation precision of the estimation value of a ratio of the near-end sound and near-end noise in the near-end signal of FIG. 19.

Herein, the value being outputted by the subtracter 744 of FIG. 19 will be explained by employing an equation. P4, being a result obtained by performing the smoothing for the entirety of line 2 of the Equation 7 employed in the explanation of the Fourier coefficient subtracter divided by S, is expressed as shown in Equation 8. The right side of this Equation 8 is nothing but the value being outputted by the subtracter 744 in FIG. 19.

$$P4 = Av[P3/S] \quad \text{(Equation 8)}$$
$$= Av[1 - \{(R/S) \times Av[(E+N)/R]\}]$$
$$= 1 - Av[\{(R/S) \times Av[(E+N)/R]\}]$$

Further, P4 is expressed as shown in the following equation as a result obtained by performing the smoothing for the entirety of line 3 of the Equation 4 divided by S.

$$P4 = Av[\{(A+E+N) - Ex[E+N]\}/S] \quad \text{(Equation 9)}$$
$$= Av[Ex[A]/S]$$
$$= Ex[A/S]$$

It can be seen from a comparison of the Equation 9 with the Equation 8 that the output P4 of the subtracter 744 becomes an estimation value of a ratio of the near-end sound in the near-end signal.

The multiplier 737 multiplies the value being outputted by the subtracter 744 by the output signal of the subtracter 4, namely, the Fourier coefficient of the signal of which the echo has been reduced by the linear echo canceller, thereby allowing the signal other than the echo signal in the near-end signal, namely, the estimation value of the Fourier coefficient of the echo-suppressed near-end sound to be gained. The above estimation value is sent to the inverse Fourier transformer 74 of FIG. 18, is synthesized into the near-end signal, and is outputted from the output terminal 75. As a result, the echo is suppressed in this synthesized near-end signal.

Now returning to FIG. 17, how the third example of the present invention operates when the distortion exists in the loudspeaker 2 etc. in the echo path will be explained. As explained by employing the Equation 8 and the Equation 9, P4 is the estimation value of a ratio of the near-end sound in the near-end signal. P3 employed in the first example of the present invention is employed at the moment of calculating this P4. As already explained in the first example of the present invention, P3 is the estimation value of the Fourier coefficient component of the near-end sound, and not only the echo component and the noise component but also the echo component of the harmonic wave generated due to the distortion have been removed also in P3. Thus, a ratio of the echo component of the harmonic wave generated due to the distortion has been removed also in P4, and the Fourier coefficient that is obtained with multiplication of this P4 has contains the distortion-suppressed echo component. The output signal of the microphone 1 contains the echo of the distortion of the far-end signal besides the far-end signal itself. This echo of the distortion can be thought as the harmonic wave of the frequency component of the echo of the far-end signal. In the third example of the present invention, the spectral suppression unit 7 can suppress the harmonic wave generated due to the distortion by employing the harmonic wave existing in the far-end signal.

As mentioned above, also in the third example shown in FIG. 17, the echo can be suppressed at a high volume level also when the echo cannot be sufficiently suppressed only with the linear echo canceller 3, for example, when the distortion exists in the echo path of the acoustic system. In addition, employing as the coefficient indicative of a degree of the echo crosstalk a value of a constant times the value obtained by performing the minimum value tracking smoothing makes it possible to sufficiently suppress the echo, and to gain the less-distorted near-end sound also when the status of the distortion of the echo is changed in an environment in which the near-end noise is large.

Figure 22:
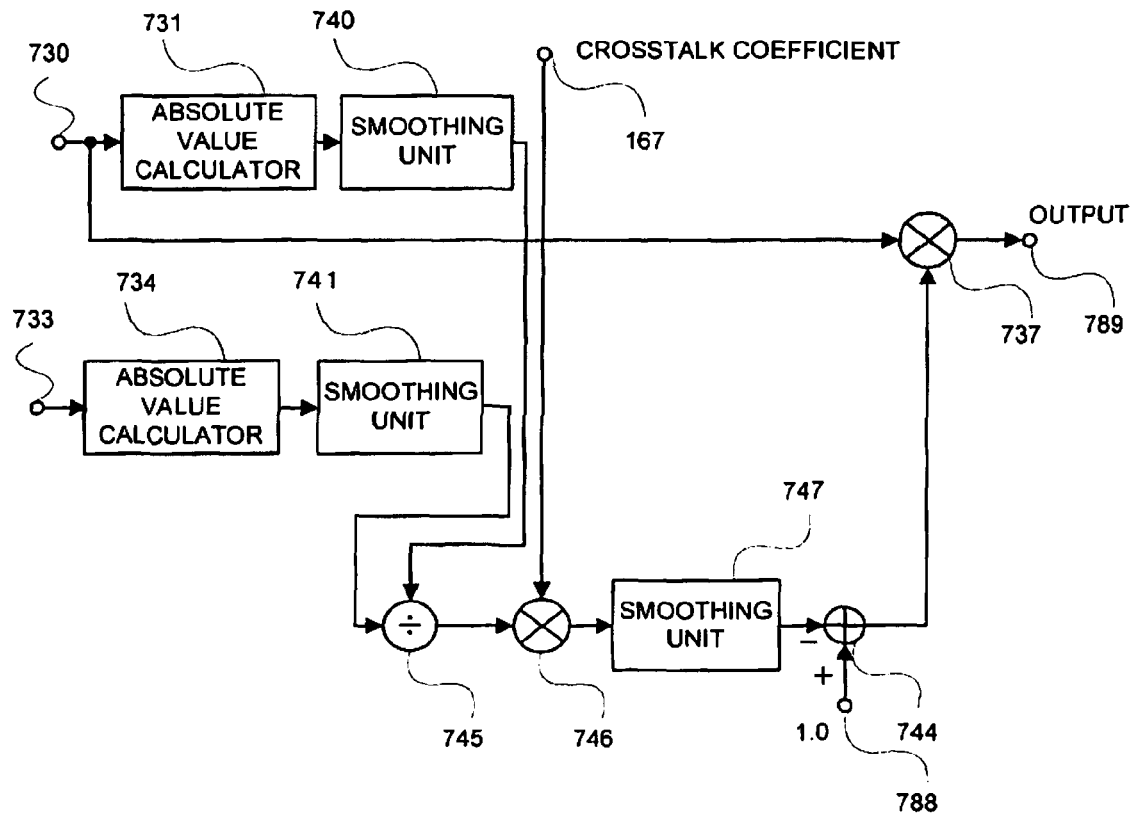
FIG. 22 is a block diagram illustrating a second exemplary configuration of the Fourier coefficient multiplier.

FIG. 22 shows a second exemplary configuration of the Fourier coefficient multiplier 76*m* (m=1 to M) of FIG. 18. A difference with the first exemplary configuration of the Fourier coefficient multiplier 76*m* shown in FIG. 19 is that a smoothing unit 740 is inserted into a signal path that goes to a divider 745 from an absolute value calculator 731, and that a smoothing unit 741 is inserted into a signal path that goes to the divider 745 from an absolute value calculator 734. An exemplary configuration of the smoothing unit 740 and that of the smoothing unit 741, each of which is similar to that of a smoothing unit 747, differ from each other in the smoothing coefficient, and so its explanation is omitted. A quotient being inputted as the output of the divider 745 into the smoothing unit 747 via the multiplier 746 is also smoothed because two inputs of the divider 745 are smoothed by the smoothing unit 740 and the smoothing unit 741, respectively. As a result, this second exemplary configuration gains the more stabilized value as the output of the smoothing unit 747 than the first exemplary configuration of FIG. 19. However, there is no difference between the first exemplary configuration and the second exemplary configuration as to a function of gaining an estimation value of a ratio of the near-end sound over the near-end signal in the output of the subtracter 744. Thus, an advantageous effect of the present invention is gained also in the case of employing the second exemplary configuration shown in FIG. 22 as a configuration of the Fourier coefficient multiplier 76*m* (m=1 to M), similarly to the case of employing the first exemplary configuration shown in FIG. 19.

Figure 23:
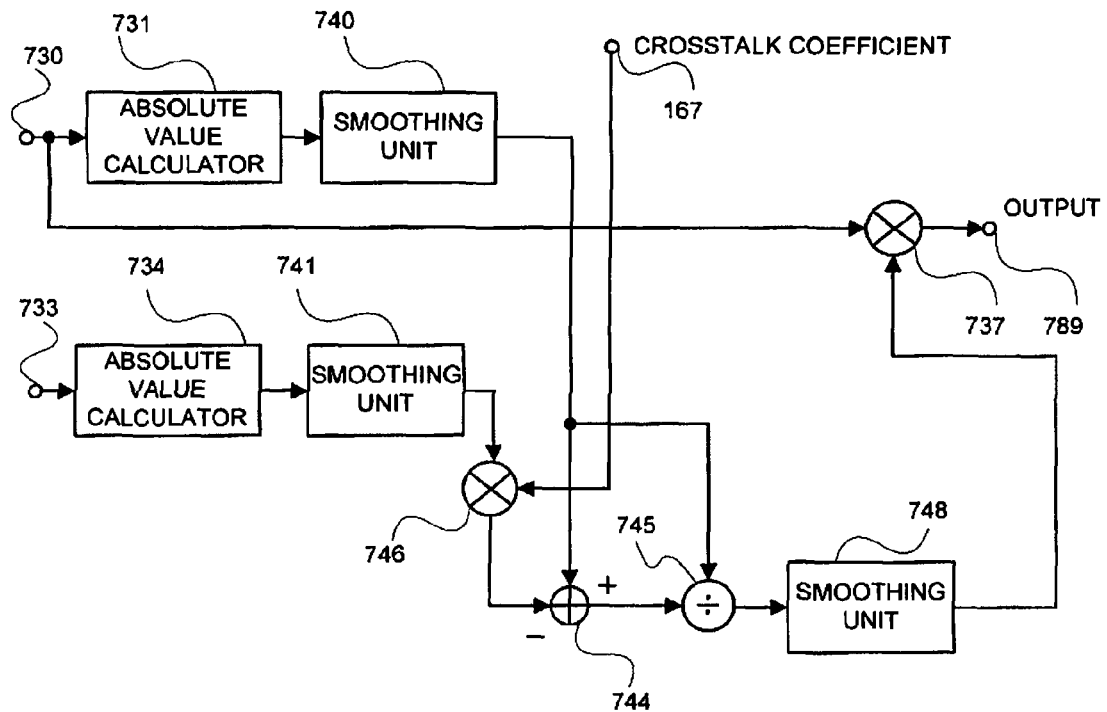
FIG. 23 is a block diagram illustrating a third exemplary configuration of the Fourier coefficient multiplier.

FIG. 23 shows a third exemplary configuration of the Fourier coefficient multiplier 76*m* (m=1 to M) of FIG. 18. A difference with the second exemplary configuration of the Fourier coefficient multiplier 76*m* shown in FIG. 22 is that the order of processes in the path, which goes from the smoothing unit 740 and the smoothing unit 741 to the multiplier 737, is shifted, and hereinafter, this difference will be explained.

The output of the smoothing unit 740 is sent to the subtracter 744 and a divider 745. The output of the smoothing unit 741 is sent to a multiplier 746. The multiplier 746 multiplies the value outputted by the smoothing unit 741 by the crosstalk coefficient being inputted through the terminal 167 from the coefficient generator 200, and sends a result to the subtracter 744. The subtracter 744 subtracts the value received from multiplier 746 from the value received from the smoothing unit 740, and sends a result to the divider 745. The divider 745 divides the value received from the subtracter 744 by the value received from the smoothing unit 740, and sends a result to the smoothing unit 748. The smoothing unit 748 smoothes the value received from divider 745, and sends a result to the multiplier 737.

While an exemplary configuration of the smoothing unit 748 is similar to that of the smoothing unit 747, the former differs from the latter in the smoothing coefficient. Employing the configuration shown in FIG. 21 as an exemplary configuration of the smoothing unit 748 enables the envelope, in which the rising rate is fast and the falling rate is slow, like the envelope of the actual sound and music to be generated depending upon the setting of the smoothing coefficient, and an estimation precision of the estimation value of a ratio of the near-end sound and near-end noise in the near-end signal to be improved.

Herein, upon expressing P5, being a result of the smoothing unit 748's performing the smoothing, with an equation, the following Equation 10 is yielded.

$$P5 = Av[(Av[S] - P1 \times Av[R])/Av[S]] \qquad \text{(Equation 10)}$$
$$= Av[(Av[(A + E + N) - Ex[E]])/Av[S]]$$
$$= Av[Ex[A + N] - /Av[S]]$$
$$= Ex[(A + N)/S]$$

It can be seen from the Equation 10 that P5, similar to P4, is an estimation value of a ratio of the near-end sound over the near-end signal. Thus, a third exemplary configuration of FIG. 23 has a function similar to that of the second exemplary configuration of FIG. 22, so an advantageous effect similar to the case of the first exemplary configuration shown in FIG. 19 is gained.

Fourth Example

Figure 24:
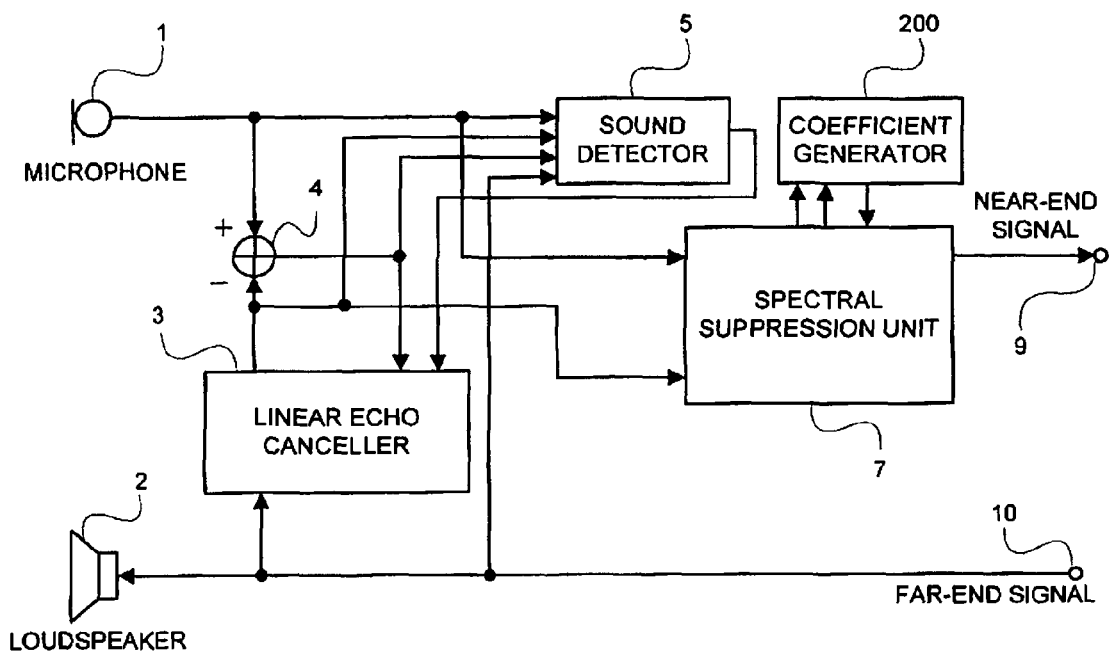
FIG. 24 is a block diagram illustrating a fourth example of the present invention.

FIG. 24 is a block diagram of the fourth example of the preset invention. A difference with the third example shown in FIG. 17 is that while, as a signal being inputted into the spectral suppression unit 7, the output of the subtracter 4 is employed in the third example, the output signal of the microphone 1 is employed in the fourth example. This difference is similar to a difference between the first example and the second example, and its advantageous effect is also similar to that of the third example.

While the examples of the present invention were explained above, the present invention is not limited to the above examples, various additions and modifications thereto besides the above examples are enabled. For example, the addition and modification can be made as follows.

Above, although the explanation was made with reference to the case that the Fourier transform was performed for each sampling period in the spectral subtraction unit and the spectral suppression unit, the Fourier transform is not necessarily performed for each sampling period, but may be performed on a fixed-interval frame basis. Further, the Fourier transform can be performed in such a way that frames overlap each other. At this moment, it is also possible to reduce the arithmetic amount by employing the methods such as an overlap-save method and an overlap-add method. The methods such as an overlap-save method and an overlap-add method are described in the paper "Frequency-Domain and Multirate Adaptive Filtering" by John J. Shynk, which appeared in January, 1992 in IEEE Signal Processing Magazine on pages 14 to 37 (hereinafter, referred to as Non-patent document 5).

Above, although the explanation was made with reference to the case that the Fourier transform was performed in the spectral subtraction unit and the spectral suppression unit, it is also possible to employ the linear transforms such as a cosine transform and a filter bank besides the Fourier transform. Further, the process can be even performed after subband domain transformation. In these cases, the Fourier coefficient subtracter and the Fourier coefficient multiplier may be changed responding to the linear transform being employed. For example, the Fourier coefficient subtracter and the Fourier coefficient multiplier becomes a cosine coefficient subtracter, and a cosine coefficient multiplier, respectively, when the cosine transform is employed. An operation thereof is similar to that of the Fourier transform used as a linear transform.

Fifth Example

Employing a transform domain echo canceller as the linear echo canceller of the present invention, and in addition, setting a transform domain of the transform domain echo canceller to the same transform domain as that of the spectral subtraction unit or the spectral suppression unit makes it possible to reduce the arithmetic amount, and to shorten the delay time accompanied with the arithmetic operation. Herein, the so-called transform domain echo canceller refers to an echo canceller that performs an echo canceller operation in the transform domain expanded by performing the linear transform, and performs re-synthesis into an original domain by performing the inverse linear transform.

Figure 25:
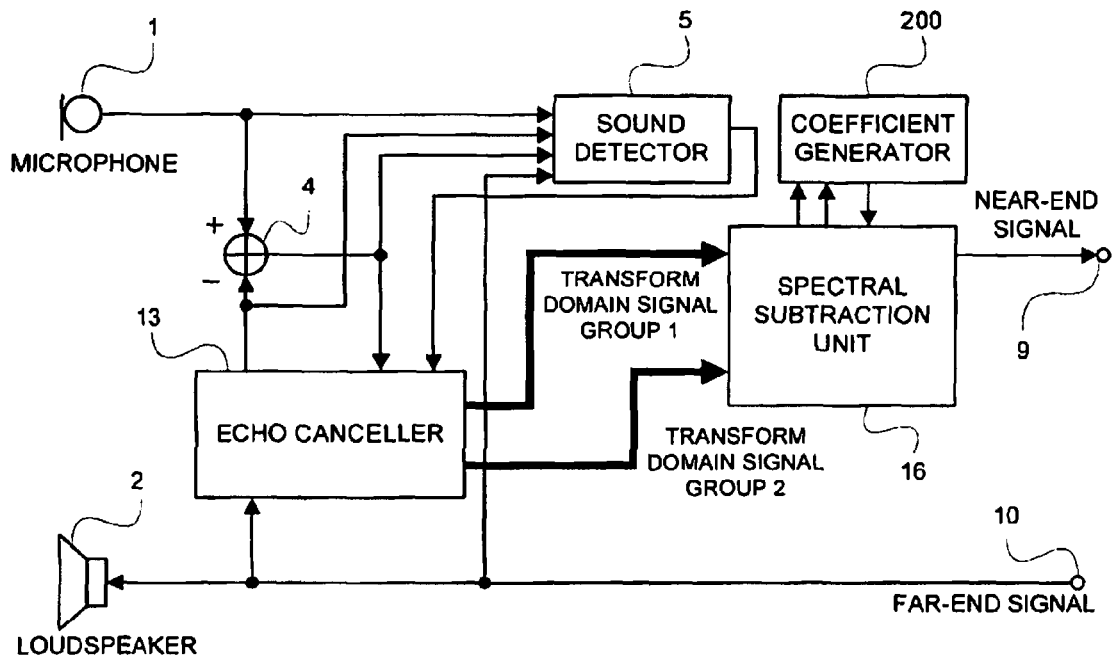
FIG. 25 is a block diagram illustrating a fifth example of the present invention.

An example of the case of employing a Fourier transform domain echo canceller described in Non-patent document 5 as the linear echo canceller will be explained by employing the figure. FIG. 25 shows the fifth example of the present invention. In this fifth example of the present invention, the echo cancellation operation and the spectral subtraction operation are performed in a Fourier transform domain. A difference with the first example shown in FIG. 13 is that the linear echo canceller 3 is replaced with an echo canceller 13, the spectral subtraction unit 6 is replaced with a spectral subtraction unit 16, and two of the input signals into the spectral subtraction unit 16 are replaced with a transform domain signal group 1 and a transform domain signal group 2 that are outputted from the echo canceller 13.

Figure 26:
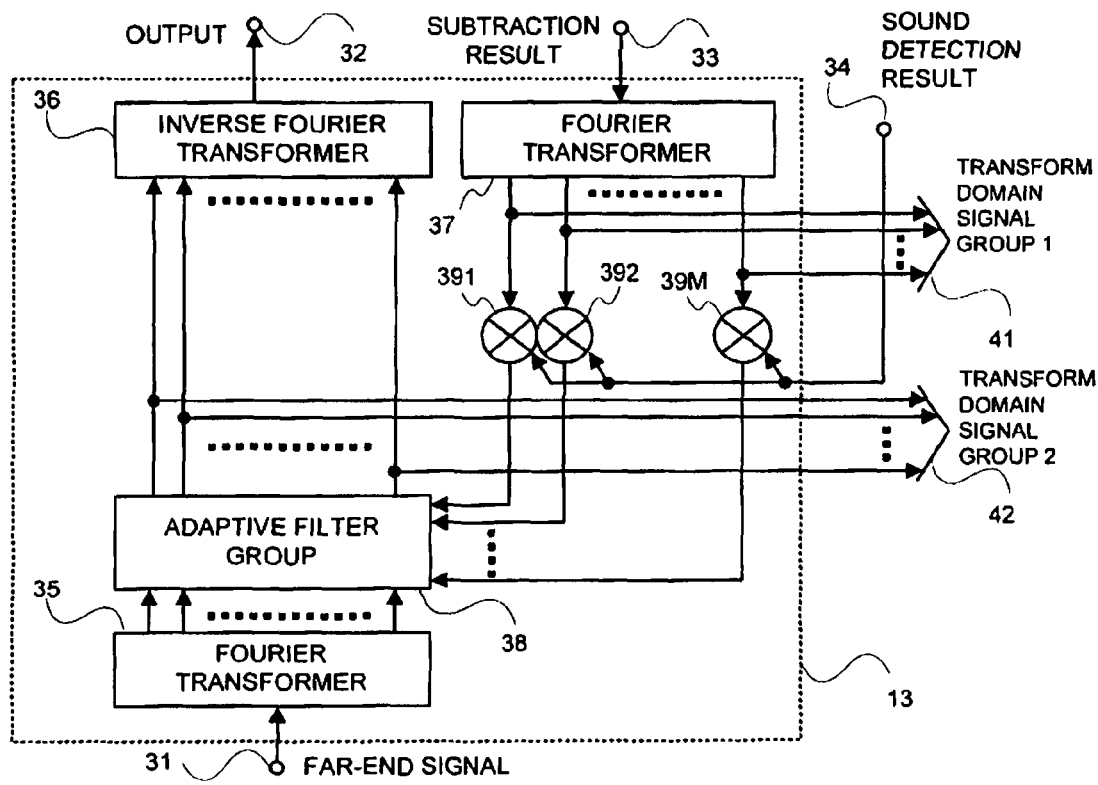
FIG. 26 is a block diagram illustrating a configuration of the echo canceller.

FIG. 26 is a block diagram illustrating an exemplary configuration of the echo canceller 13 in the fifth example of the present invention. The far-end signal inputted from the terminal 31 is expanded in the Fourier transform domain by a Fourier transformer 35, and is sent to an adaptive filter group 38 frequency by frequency. A subtraction result inputted through the terminal 33 from the subracter 4 of FIG. 25 is expanded in the Fourier transform domain by a Fourier transformer 37, and is sent frequency by frequency to multipliers 39m (m=1 to M), respectively. Each of the multipliers 39m (m=1 to M) multiplies the signal received from the Fourier transformer 37 by the sound detection result received from the terminal 34, and sends its result to the adaptive filter group 38. The adaptive filter group 38, which is configured of M adaptive filters, receives the signal group 2 outputted from the Fourier transformer 35 and the signal group 1 outputted from the multiplier 39m (m=1 to M), and performs an adaptive filtering process by employing signals that correspond to each other. Respective filter results obtained by the adaptive filtering process are sent to an inverse Fourier transformer 36. The inverse Fourier transformer 36 picks up the filter result obtained from the adaptive filter group 38, calculates its inverse Fourier transform, and outputs a result from the terminal 32. The signal being outputted from the terminal 32 is a signal outputted from the echo canceller.

The echo canceller 13 outputs the signal as an echo canceller, and besides, it outputs the signal group, which the Fourier transformer 37 outputs, as the transform domain signal group 1 from a vector output terminal 41 for the spectral subtraction, and outputs a filter result group, which the adaptive filter group 38 outputs, as the transform domain signal group 2 from a vector output terminal 42. The transform domain signal group 1 and the transform domain signal group 2 are sent to the spectral subtraction unit 16 of FIG. 25. The transform domain signal group 1 can be considered to be the signals obtained by performing the Fourier transform for the signals outputted from the subtracter 4 of FIG. 25. Further, the transform domain signal group 2 can be interpreted as the signals obtained by performing the Fourier transform for the signals that go toward the subtracter 4 from the echo canceller 13 in FIG. 25.

Figure 27:
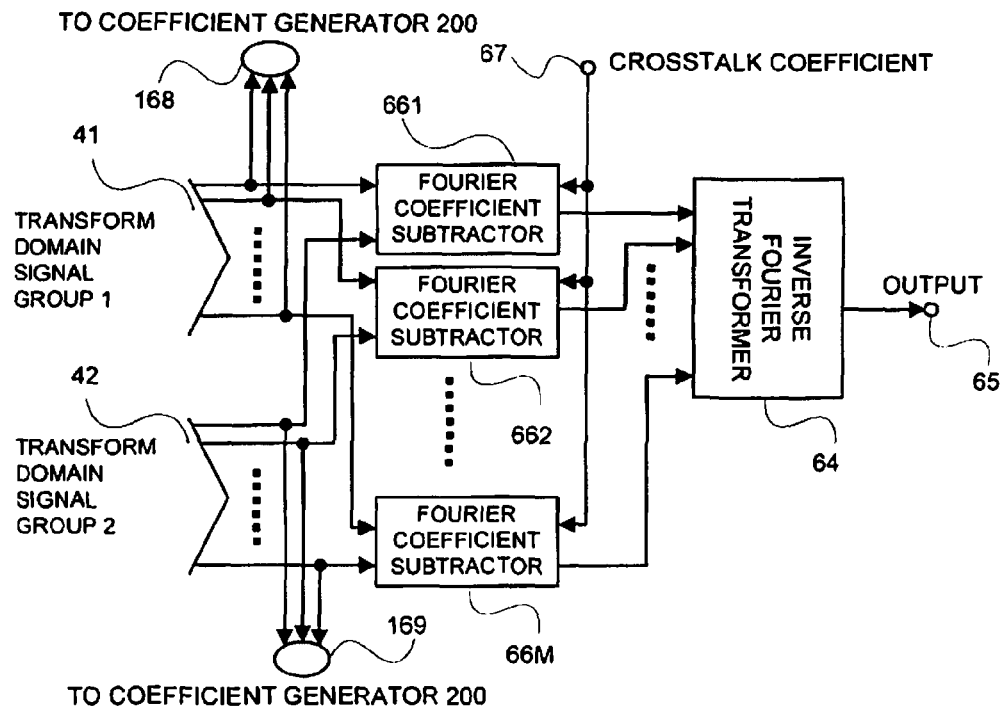
FIG. 27 is a block diagram illustrating an exemplary configuration of the spectral subtraction unit.

A configuration and an operation of the spectral subtraction unit 16 will be explained by employing the figure. FIG. 27 is a block diagram illustrating an exemplary configuration of the spectral subtraction unit 16. A difference with the exemplary configuration of the spectral subtraction unit shown in FIG. 14, which was explained in the first example of the present invention, is that two input signals are replaced with the transform domain signal group 1 and the transform domain signal group 2, and that the Fourier transformer 60 and the Fourier transformer 61 of FIG. 14 are deleted. As explained in the exemplary configuration of the echo canceller shown in FIG. 26, the transform domain signal group 1 is the signals obtained by performing the Fourier transform for the signals outputted from the subtracter 4 of FIG. 25, and the transform domain signal group 2 is the signals obtained by performing the Fourier transform for the signals that go toward the subtracter 4 from the echo canceller 13 in FIG. 25. These are completely identical to the two signals being inputted into the Fourier coefficient suntracters 66$m$ (m=1 to M) in the spectral subtraction unit shown in FIG. 14. Thus, the spectral subtraction unit 16 shown in FIG. 27 can output a signal completely identical to the signal that the spectral subtraction unit shown in FIG. 14 outputs. Thus, it can be seen that the fifth example as well of the present invention shown in FIG. 25 has an advantageous effect identical to that of the first example of the present invention. The two input signals into the spectral subtraction unit 16 are directly connected as the transform domain signal group 1 and the transform domain signal group 2 coming from the echo canceller 13, thereby making a possible to gain an advantageous effect of the present invention while reducing the amount of the Fourier transform inside the spectral subtraction unit 16.

The fifth example of the present invention corresponds to the first example of the present invention, and in the same manner, the other examples of the present invention can be also realized in the transform domain. Further, a cosine transform domain etc. can be also employed besides the Fourier transform domain.

Sixth Example

Employing the subband domain echo canceller described in the Non-patent document 5 as the linear echo canceller, and yet performing the process in the spectral subtraction unit or the spectral suppression unit in a subband domain makes it possible to omit a filter for subband domain transformation in each process and connection of the parts, and to make a connection within the subband domain. This example will be explained by employing the figure.

Figure 28:
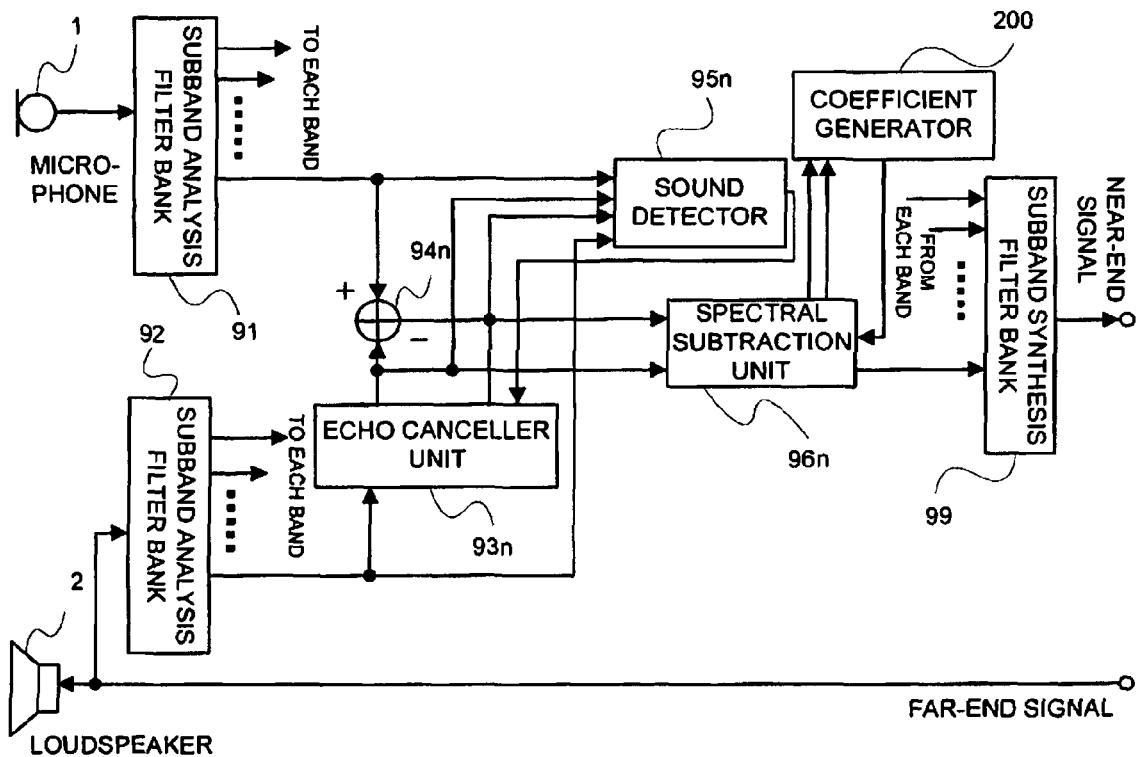
FIG. 28 is a block diagram illustrating a sixth example of the present invention.

FIG. 28 is a block diagram illustrating the sixth example of the present invention. In this sixth example of the present invention, the echo cancellation operation and the spectral subtraction operation are performed in the subband domain. At first, the signal coming from the microphone 1 is expanded by a subband analysis filter bank 91 into N bands, and the far-end signal is expanded by a subband analysis filter bank 92 into N bands. An echo canceller unit 93$n$, a subtracter 94$n$, a sound detector 95$n$, and a spectral subtraction unit 96$n$ (herein, n=1 to N) are provided for each expanded band. The output signal of the by-band spectral subtraction unit 96$n$ is picked up by a subband synthesis filter bank 99, is inverse-transformed into the signal in the original signal domain, and is outputted as the near-end signal. The processes in each band of the subtracter 94$n$, the sound detector 95$n$, and the spectral subtraction unit 96$n$ (herein, n=1 to N) differ from those of the first example of the present invention shown in FIG. 13 in the number of the taps of the echo canceller and the scale of the Fourier transformer of the spectral subtraction unit; however the subtracter 94$n$, the sound detector 95$n$, and the spectral subtraction unit 96$n$ operate in a manner similar to those in the first example except for them, so the detailed explanation of the above process is omitted. In the sixth example of the present invention, the connection can be made with the synthesis filter bank in the linear echo canceller 3 and the subband analysis filter bank in the spectral subtraction unit omitted because all of the processes are performed after the subband domain transformation. In this case, the arithmetic amount equivalent to the omitted subband analysis filter bank and subband synthesis filter bank is reduced, and further, the delay time equivalent to the above arithmetic amount is shortened. A configuration in which the spectral subtraction unit of the sixth example of the present invention is replaced with the spectral suppression unit is also enabled. Further, a configuration in which the transform domain is the domain other than the subband domain is also enabled.

The sixth example of the present invention corresponds to the first example of the present invention, and in the same manner, the other examples of the present invention can be also realized in the subband domain. Further, the cosine transform domain etc. can be also employed besides the Fourier transform domain.

Seventh Example

Figure 29:
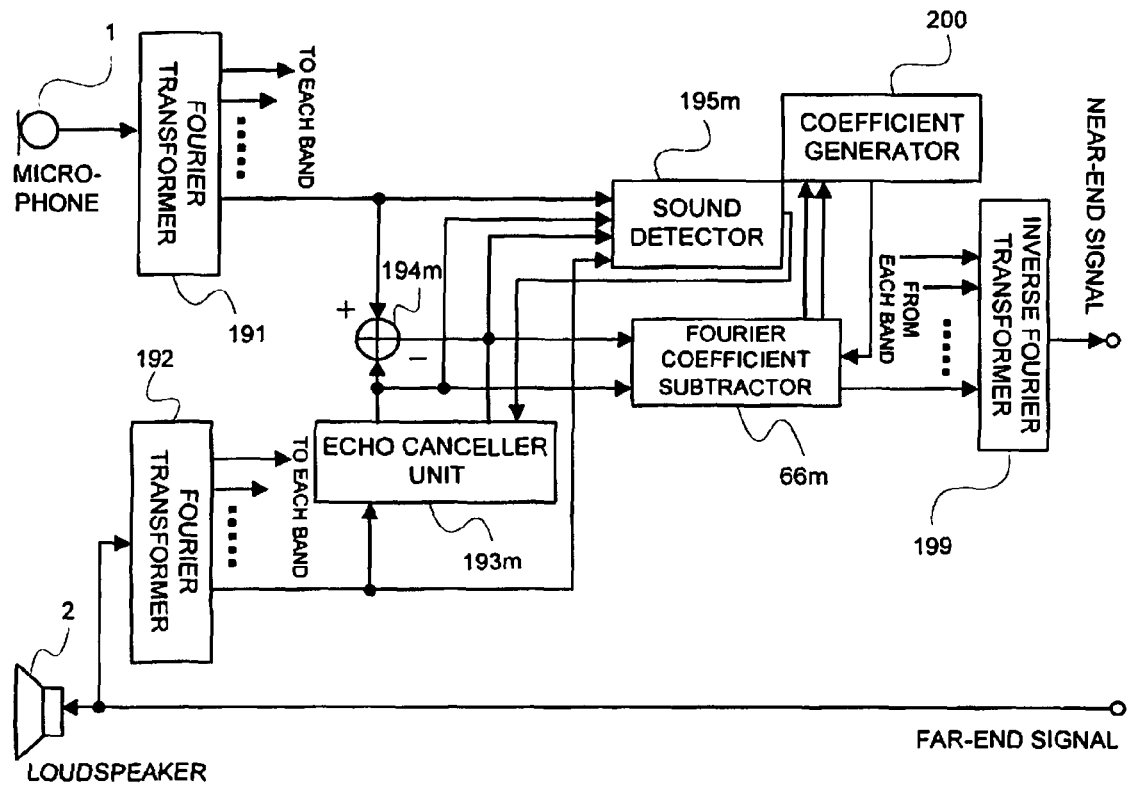
FIG. 29 is a block diagram illustrating a seventh example of the present invention.

FIG. 29 is a block diagram illustrating the seventh example of the present invention. In the seventh example of the present invention, the echo cancellation operation and the spectral subtraction operation are performed in a Fourier transform domain. At first, the signal coming from the microphone 1 is expanded by a Fourier transformer 191 into M bands, and the far-end signal is expanded by a Fourier transformer 192 into M bands. An echo canceller unit 193$m$, a subtracter 194$m$, a sound detector 195$m$, and a Fourier coefficient subtracter 66$m$ (herein, m=1 to M) are provided for each expanded band. The output signal of the by-band Fourier coefficient subtracter 66$m$ is picked up by an inverse Fourier transformer 199, is inverse-transformed into the signal in the original signal domain, and is outputted as the near-end signal. The processes in each band of the subtracter 194$m$ and the sound detector 195$m$ (herein, m=1 to M) differ from those of the first example of the present invention shown in FIG. 13 in the number of the taps of the echo canceller; however the subtracter 194$m$ and the sound detector 195$m$ operate in a manner similar to those in the first example except for it, so the detailed explanation of the above process is omitted. While the process is performed in the transform domain not only in the sixth example of the present invention but also in the seventh example of the present invention, a different point with the sixth embodiment is that the number of the bands is larger because the transform domain differs, and that the seventh example assumes a configuration in which the spectral subtraction unit of FIG. 28 is replaced with the Fourier coefficient subtracter 66$m$ in FIG. 29. That is, the Fourier transformer and the inverse Fourier transformer in the spectral subtraction unit become useless, and an operation necessary for the spectral subtraction is performed only by the Fourier coefficient subtracter 66*m*. The reason is that in the seventh example of the present invention, the Fourier transform does not need to be performed over again in order to perform the spectral subtraction because all of the processes have been already expanded into a large number of the bands of the Fourier transform domain. In the seventh example of the present invention, the arithmetic amount equivalent to the omitted Fourier transformer and inverse Fourier transformer is reduced. Further, a configuration in which the Fourier coefficient subtracter of the seventh example of the present invention is replaced with the Fourier coefficient multiplier is also enabled.

The seven example of the present invention corresponds to the first example of the present invention, and in the same manner, the other examples of the present invention can be also realized in the Fourier transform domain. Further, the cosine transform domain etc. can be also employed besides the Fourier transform domain.

Above, although the explanation was made with reference to the case of employing the linear echo canceller, an advantageous effect is gained also in the case of employing the non-linear echo canceller instead of the linear echo canceller when the non-linear echo canceller is combined with the spectral subtraction unit or the spectral suppression unit.

Above, although the present invention was explained with the hands-free telephone set as an application example, the present invention is also applicable to the sound pickup in an environment in which the loudspeaker produces music, and the sound pickup in an environment in which the echo coming from a receiver provided in a handset causes a problem, besides the hands-free telephone set.

This application is based upon and claims the benefit of priority from Japanese patent application No. 2007-272524, filed on Oct. 19, 2007, the disclosure of which is incorporated herein in its entirety by reference.

The invention claimed is:

1. An echo suppression method of suppressing an echo caused by acoustic system coupling between a sound pickup apparatus and a loudspeaker, said method comprising:
    detecting a time-changing minimum value of an amplitude ratio of a first signal, being either an output signal of the sound pickup apparatus or a signal obtained by subtracting an output signal of an echo canceller, which is generated based upon an input signal into the loudspeaker, from the output signal of the sound pickup apparatus to a second signal, being said output signal of the echo canceller;
    generating a value of a constant times the above detected minimum value as a crosstalk coefficient indicative of a degree of crosstalk of the echo; and
    correcting said first signal based upon the above generated crosstalk coefficient and said second signal.

2. An echo suppression method according to claim 1, comprising:
    detecting and storing said minimum value for each of respective different use conditions of a apparatus comprising said sound pickup apparatus and said loudspeaker; and
    detecting said use condition of the apparatus, and generating a value of a constant times said stored minimum value corresponding to the above detected use condition as a crosstalk coefficient indicative of a degree of the crosstalk of the echo.

3. An echo suppression method according to claim 2, wherein said use condition is one of a power or an amplitude of said output signal of the echo canceller, a power or an amplitude of a far-end signal, and a power or an amplitude of a specific frequency component of the far-end signal.

4. An echo suppression method according to claim 2, wherein said use condition is a sound volume level setting of said loudspeaker.

5. An echo suppression method according to claim 2, wherein said use condition is a relative positional relation between said sound pickup apparatus and said loudspeaker.

6. An echo suppression method according to claim 2, wherein when at least one of said sound pickup apparatus and said loudspeaker exists in multiple numbers, said use condition is a selection status thereof.

7. An echo suppression method according to one of claim 1, wherein said amplitude ratio is an amplitude ratio for a time average of the amplitudes of said second signal and a time average of the amplitudes of said first signal.

8. An echo suppression method according to one of claim 1, wherein the detection of said time-changing minimum value of the amplitude ratio is performed by performing smoothing in which a falling rate is fast and a rising rate is slow for said amplitude ratio.

9. An echo suppression method according to one of claim 1, wherein the detection of said time-changing minimum value of the amplitude ratio is performed by performing smoothing in which a falling rate is fast and a rising rate is slow for a value of said time-averaged amplitude ratio.

10. An echo suppression method according to one of claim 1, comprising correcting said first signal based upon the crosstalk coefficient indicative of a degree of the echo crosstalk by frequency component for each frequency component of said first signal.

11. An echo suppression method according to one of claim 1, comprising:
    estimating a volume level of the echo being contained in said first signal from said crosstalk coefficient and said second signal; and
    correcting said first signal by subtracting the above estimated volume level of the echo from said first signal.

12. An echo suppression method according to one of claim 1, comprising:
    estimating a ratio of a near-end signal being contained in said first signal from said crosstalk coefficient, said first signal, and said second signal; and
    correcting said first signal by multiplying said first signal by the above estimated ratio.

13. An echo suppression apparatus for suppressing an echo caused by acoustic system coupling between a sound pickup apparatus and a loudspeaker, said apparatus comprising:
    a coefficient generator that detects a time-changing minimum value of an amplitude ratio of a first signal, being either an output signal of the sound pickup apparatus or a signal obtained by subtracting an output signal of an echo canceller, which is generated based upon an input signal into the loudspeaker, from the output signal of the sound pickup apparatus to a second signal, being said output signal of the echo canceller, and generates a value of a constant times the above detected minimum value as a crosstalk coefficient indicative of a degree of crosstalk of the echo; and
    a corrector that corrects said first signal based upon the crosstalk coefficient generated by the said coefficient generator and said second signal.

14. An echo suppression apparatus according to claim 13, wherein said coefficient generator detects and stores said minimum value for each of respective different use conditions of a apparatus comprising said sound pickup apparatus and said loudspeaker, detects said use condition of the apparatus, and generates a value of a constant times said stored minimum value corresponding to the above detected use condition as a crosstalk coefficient indicative of a degree of the crosstalk of the echo.

15. An echo suppression apparatus according to claim 13, wherein:
  said coefficient generator generates said value of a constant times the minimum value for each frequency component as a crosstalk coefficient indicative of a degree of the crosstalk of the echo by employing the frequency-divided first and second signals; and
  said corrector synthesizes the first signals corrected for each of said frequency components.

16. An echo suppression apparatus according to claim 15, wherein said frequency division of the first and second signals is performed by a division means.

17. An echo suppression apparatus according to claim 15, wherein a transform domain echo canceller is employed as an echo canceller, and said frequency division of the first and second signals is performed by said transform domain echo canceller.

18. An echo suppression apparatus according to claim 15, wherein said coefficient generator generates said crosstalk coefficient with either an output signal of the sound pickup apparatus expanded into each band or a signal obtained by subtracting an output signal of the echo canceller from the output signal of the sound pickup apparatus expanded into each band defined as the first signal, and said output signal of the echo canceller as the second signal.

19. A non-transitory computer readable storage medium storing computer instructions for causing a computer to execute the instructions to suppress an echo caused by acoustic system coupling between a sound pickup apparatus and a loudspeaker, said instructions causing said computer to implement a method comprising:
  detecting a time-changing minimum value of an amplitude ratio of a first signal, being either an output signal of the sound pickup apparatus or a signal obtained by subtracting an output signal of an echo canceller, which is generated based upon an input signal into the loudspeaker, from the output signal of the sound pickup apparatus to a second signal, being said output signal of the echo canceller;
  generating a value of a constant times the above detected minimum value as a crosstalk coefficient indicative of a degree of crosstalk of the echo; and
  correcting said first signal based upon the above generated crosstalk coefficient and said second signal.

\* \* \* \* \*